(12) United States Patent
Rahman et al.

(10) Patent No.: US 12,022,337 B2
(45) Date of Patent: Jun. 25, 2024

(54) SWITCHING OF TRANSMISSION BETWEEN CELL GROUPS

(71) Applicant: Telefonaktiebolaget LM Ericsson (publ), Stockholm (SE)

(72) Inventors: Imadur Rahman, Sollentuna (SE); Christian Bergljung, Lund (SE); Muhammad Kazmi, Sundbyberg (SE); Magnus Larsson, Sollentuna (SE)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/767,482

(22) PCT Filed: Nov. 28, 2018

(86) PCT No.: PCT/EP2018/082901
§ 371 (c)(1),
(2) Date: May 27, 2020

(87) PCT Pub. No.: WO2019/106050
PCT Pub. Date: Jun. 6, 2019

(65) Prior Publication Data
US 2020/0413305 A1    Dec. 31, 2020

Related U.S. Application Data

(60) Provisional application No. 62/591,421, filed on Nov. 28, 2017.

(51) Int. Cl.
*H04W 36/00* (2009.01)
*H04W 36/08* (2009.01)
(Continued)

(52) U.S. Cl.
CPC ... *H04W 36/0072* (2013.01); *H04W 36/0055* (2013.01); *H04W 36/0069* (2018.08);
(Continued)

(58) Field of Classification Search
None
See application file for complete search history.

(56) References Cited

U.S. PATENT DOCUMENTS

2015/0146684 A1* 5/2015 Yang ............... H04W 52/40
370/331
2017/0048803 A1* 2/2017 Yi ................... H04W 52/34
(Continued)

FOREIGN PATENT DOCUMENTS

CN    106134263 A    11/2016
CN    106576366 A    4/2017
(Continued)

OTHER PUBLICATIONS

International Search report and Written Opinion dated Mar. 5, 2019, for International Application No. PCT/EP2018/082901 filed on Nov. 28, 2018, consisting of 21-pages.
(Continued)

*Primary Examiner* — Jutai Kao
(74) *Attorney, Agent, or Firm* — Weisberg I.P. Law. P.A.

(57) ABSTRACT

A method, system and apparatus for switching of a transmission between cell groups. According to one aspect of the disclosure, a network node is configured to provide a first cell on a first carrier and to communicate with a wireless device where the first cell is part of a first cell group is provided. The network node includes processing circuitry configured to: receive a transmission from a wireless device after a time period following a switching of a transmission from a second cell being part of a second cell group, the first cell group being different from the second cell group; and determine a timing value corresponding to the time period, the time value being associated at least in part with the second cell group.

12 Claims, 14 Drawing Sheets

(51) Int. Cl.
*H04W 36/36* (2009.01)
*H04W 56/00* (2009.01)
*H04W 72/0446* (2023.01)

(52) U.S. Cl.
CPC .......... *H04W 36/08* (2013.01); *H04W 36/36* (2013.01); *H04W 56/0005* (2013.01); *H04W 56/0045* (2013.01); *H04W 72/0446* (2013.01)

(56) References Cited

U.S. PATENT DOCUMENTS

| | | | |
|---|---|---|---|
| 2017/0094576 A1 | 3/2017 | Kazmi et al. | |
| 2017/0302419 A1* | 10/2017 | Liu | H04L 5/0078 |
| 2017/0303182 A1* | 10/2017 | Uchino | H04W 16/12 |

FOREIGN PATENT DOCUMENTS

| | | |
|---|---|---|
| WO | 2016003044 A1 | 1/2016 |
| WO | 2017167767 A1 | 10/2017 |

OTHER PUBLICATIONS

3GPP TS 36.300 V14.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14); Sep. 2017, consisting of 329-pages.
3GPP TSG-RAN WG4 #79 R4-164223; Title: UE RF issues related to SRS carrier based switching for LTE; Agenda Item: 7.17.2; Document for: Discussion; Source: Ericsson; Location and Date: Nanjing, China, May 23-27, 2016, consisting of 4-pages.
3GPP TS 38.300 V1.2.0; 3rd Generation Partnership Project; Technical Specification Group Radio Access Network; NR; NR and NG-RAN Overall Description; Stage 2 (Release 15); Nov. 2017, consisting of 60-pages.
3GPP TR 37.863-05-01 V0.0.1; 3rd Generation Partnership Project; Technical Specification Group Radio Access Networks; Dual connectivity (DC) band combinations of LTE 5DL/1UL + one NR band (Release 15); Oct. 2017, consisting of 10-pages.
Chinese Office Action and English Summary dated Mar. 31, 2022 for Application No. 201880087917.6, consisting of 13 pages.
3GPP TS 36.300 V13.9.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13); Sep. 2017, consisting of 313-pages.
3GPP TSG RAN WG2 Meeting #83 R2-132620; Title: Mobility and Node Selection in Combined Cell Deployment for Heterogeneous Networks; Agenda Item: 10.2.5; Source: Ericsson, ST-Ericsson; Document for: Discussion and Decision; Location and Date: Barcelona, Spain, Aug. 19-23, 2013, consisting of 9 pages.
3GPP TSG RAN WG1 Meeting #78 R1-143133; Title: New L1 procedure for small cell on/off transition time reduction; Source: ZTE; Agenda Item: 7.2.1.2.1; Document for: Discussion and Decision; Location and Date: Dresden Germany, Aug. 18-22, 2014, consisting of 5 pages.
Miao, Jian-Song; Research on Multi-Path Source Routing Algorithm Based on Queue Length in Mobile Ad Hoc Networks; Journal of Jilin University; vol. 24 No. 4; Jul. 2006, consisting of 5 pages.

* cited by examiner

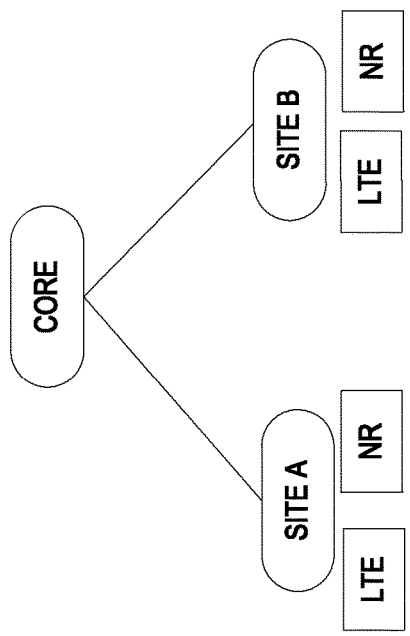
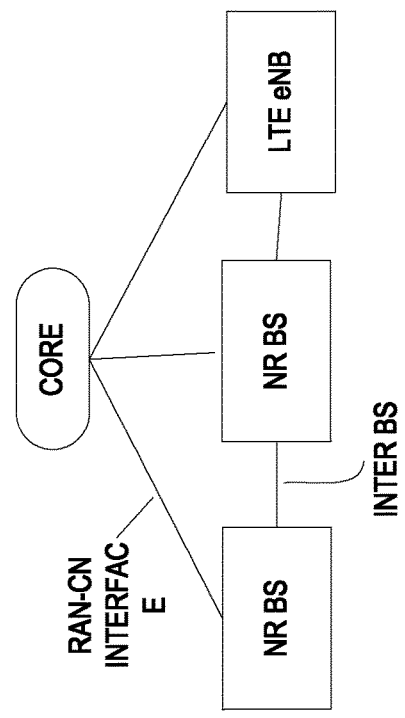
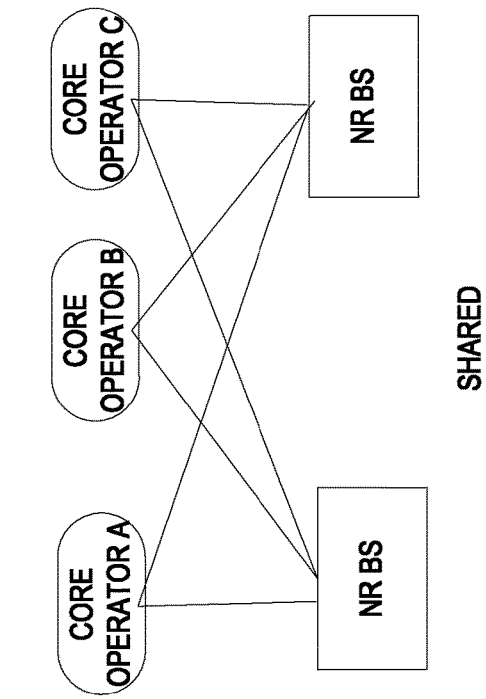
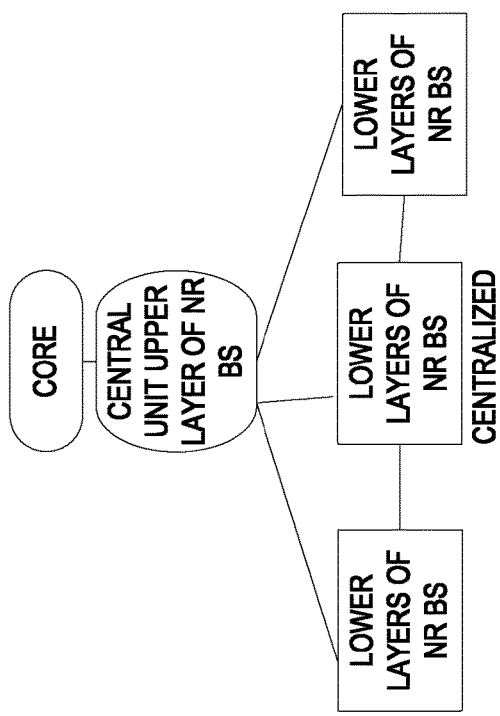

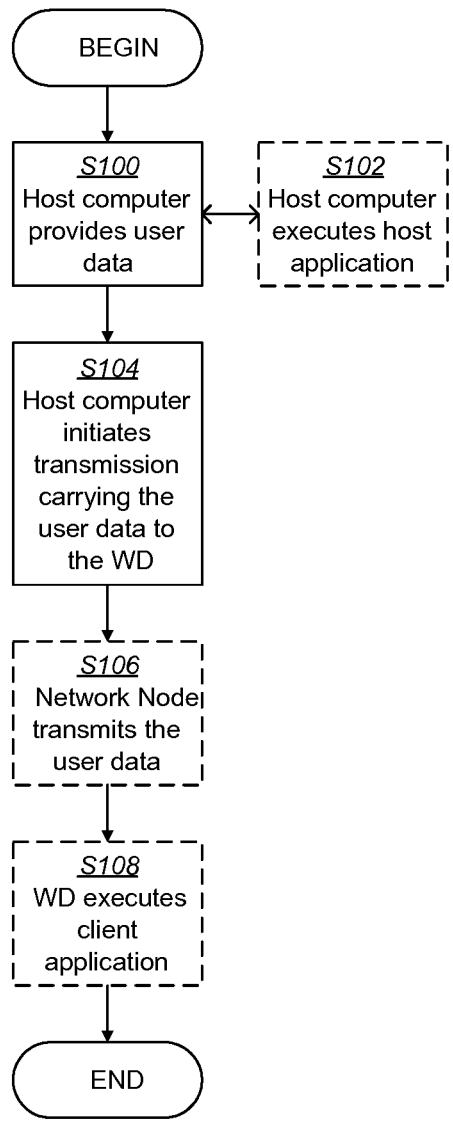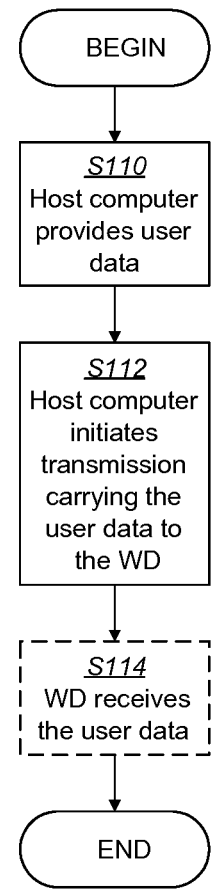
FIG. 11                    FIG. 12

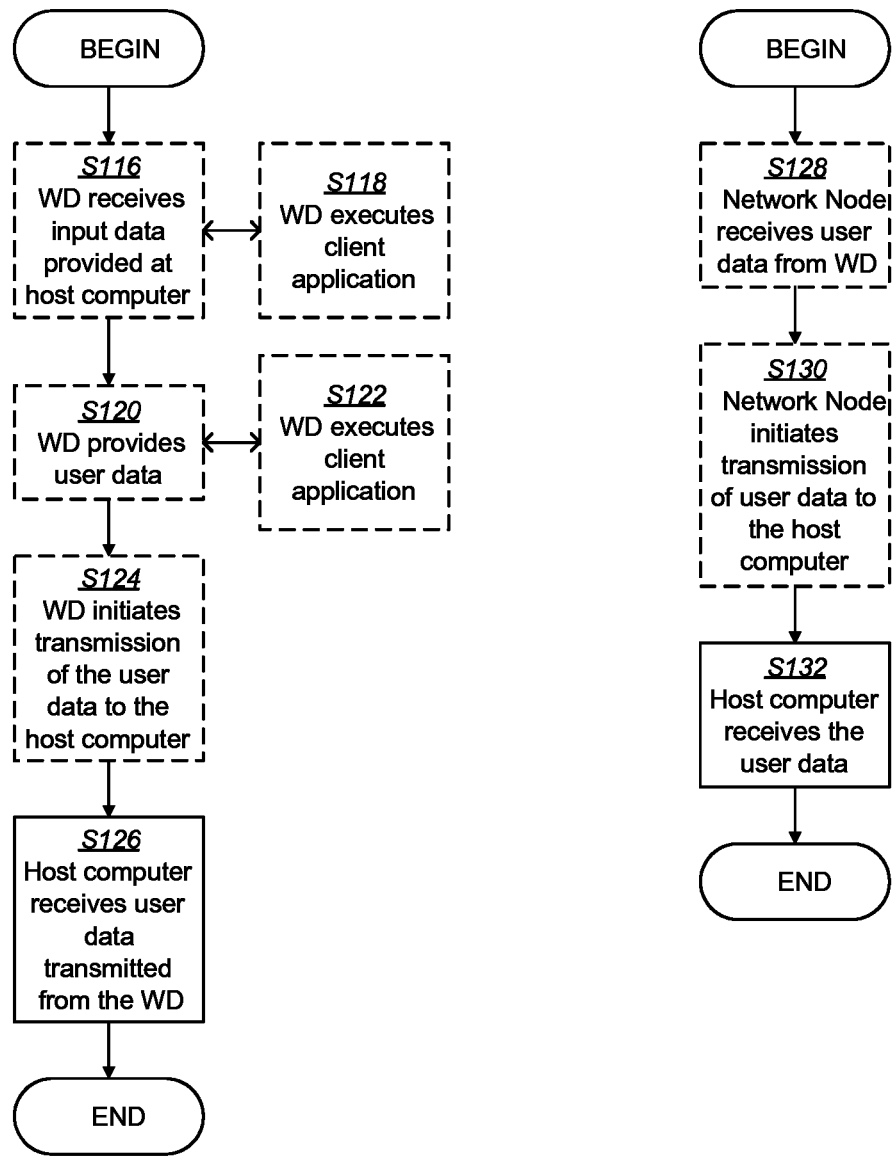

SWITCHING OF TRANSMISSION BETWEEN CELL GROUPS

CROSS-REFERENCE TO RELATED APPLICATIONS

This application is a Submission Under 35 U.S.C. § 371 for U.S. National Stage Patent Application of International Application No.: PCT/EP2018/082901, filed Nov. 28, 2018 entitled "SWITCHING OF TRANSMISSION BETWEEN CELL GROUPS," which claims priority to U.S. Provisional Application No.: 62/591,421, filed Nov. 28, 2017, entitled "METHODS AND APPARATUSES ADAPTATION OF INTERRUPTION TIME DUE TO SINGLE TRANSMIT OPERATION IN NEW RADIO," the entireties of both of which are incorporated herein by reference.

TECHNICAL FIELD

The present disclosure relates to wireless communications comprising groups of cells, and in particular, to switching of transmission between cell groups.

BACKGROUND

New Radio (NR), also known as 5G or Next Generation, architecture is being discussed in Third Generation Partnership Project 3GPP and the current concept is illustrated in FIG. 1, where eNB denotes Long Term Evolution (LTE) eNodeB, gNB and ng-eNB (or evolved eNB) denote NR base stations (BS) where one NR BS may correspond to one or more transmission/reception points, and the lines between the nodes illustrate the corresponding interfaces which are under discussion by the 3GPP. Further, FIGS. 2a-d illustrate deployment scenarios with NR BS which are discussed in 3GPP standards, see for example 3GPP TS 38.300 V1.2.0 (2017-11).

An architectural consideration is the dual connectivity (DC) operation involving enhanced Universal Terrestrial Radio Access (E-UTRA) and NR. In one example of Dual Connectivity (DC) operation involving E-UTRA and NR, the E-UTRA is the master. In another example of the DC operation involving E-UTRA and NR, NR is the master. The dual connectivity operation involving only NR serving cells (e.g., NR primary cell (PCell) and NR PSCells) is also envisaged.

Both standalone and non-standalone NR deployments are being discussed by the 3GPP. The standalone deployments may be single or multi-carrier (e.g., NR carrier aggregation, CA, or dual connectivity with NR PCell and NR PSCell). The non-standalone (NSA) deployment refers to a dual connectivity (DC) deployment involving E-UTRA and NR where there is Long Term Evolution (LTE) PCell and NR PSCell (there may also be one or more LTE SCells and one or more NR SCell). LTE PCell and NR PSCell are configured in master cell group (MCG) and slave cell group (SCG) respectively. The MSG and SCG are more generally called cell groups (CG). The MCG and SCG may be configured with one or more additional serving cells, e.g., one or more LTE secondary cells (SCells) in MCG and one or more SCells in SCG.

In NR, which is based on orthogonal frequency division multiplexing (OFDM), multiple numerologies are supported for operation, e.g., transmission and/or reception of signals. The term numerology may characterize any one or more of: frame duration, subframe or transmission time interval (TTI) duration, slot duration, min-slot duration, symbol durations subcarrier spacing, number of subcarriers per physical channel (e.g., resource blocks (RB)), and number of RBs within the bandwidth.

A scaling approach (based on a scaling factor $2^N$, $N=1, 2, \ldots$) is considered for deriving subcarrier spacings for NR: 15 kHz, 30 kHz, 60 kHz, 120 KHz, etc. The numerology-specific time resource durations (e.g., slot, subframe, etc.) can then be determined in milliseconds (ms) based on the subcarrier spacing: subcarrier spacing of $(2^N*15)$ kHz gives exactly $1/2^N$ ms.

Table 1 illustrates examples of numerology for NR in terms of carrier spacings, slot duration, symbol duration, CP length etc.

TABLE 1

| Subcarrier spacing | 15 kHz | 30 kHz (2 × 15 kHz) | 60 kHz (4 × 15 kHz) | 120 kHz (8 × 15 kHz) | 240 kHz (16 × 15 kHz) |
|---|---|---|---|---|---|
| Example slot duration | 500 μs | 250 μs | 125 μs | 77.5 μs | 38.75 μs |
| OFDM symbol, duration | 66.67 μs | 33.33 μs | 16.67 μs | 8.335 μs | 4.1675 μs |
| Cyclic prefix, duration | 4.76 μs | 2.38 μs | 1.19 μs | 0.595 μs | 0.2975 μs |
| OFDM symbol including cyclic prefix | 71.43 μs | 35.71 μs | 17.86 μs | 8.93 μs | 4.465 μs |

In a recent 3GPP proposal, some LTE-NR aggregation combinations of "channels" across two bands are considered difficult to achieve, because the simultaneous uplink transmissions on these bands give rise to inter-modulation (IM) products in a downlink (DL), i.e., from base station to wireless device, band. As example of this occurrence is shown in FIG. 3. In this case, an example of inter-band frequency division duplex (FDD)-FDD case is shown. The same also happens for tide division duplex (TDD)-TDD combinations. This means that there will be combinations of "channels" across the said two bands that are not difficult to achieve, which means that the wireless device must support dual simultaneous uplink for the band combination. The definition of "channel" is still not finalized, however is expected to be a "part" of spectrum.

For the aggregation combinations where IM products due to simultaneous multiple uplink (UL), i.e., from wireless device to base station, transmitters to DL receivers in the wireless device are caused, a test case with few test points has been proposed. The test case includes a maximum allowed DL desensitization (MSD) with respect to reference sensitivity (REFSENS) for the ULs at given power levels and the PRB allocations on the two UL carriers set so as to maximize the desensitization. The MSD will be a worst case value based on multi-vendor input and containment margin. In practice, any problems with IM depend on the actual output power of the UL, the power balance, the allocations, the wanted signal levels and other interference. Then, the different wireless device implementations will have varying performance. In an ideal scenario, the BS will get channel state information (CSI) reports and PHR and may perhaps be able to take action for a "notorious" band combination, if the IM can be distinguished from other external interference. It is worth noting here that the same problem will happen with transmit (TX) harmonics and harmonic mixing in principle (wireless device performance will differ). IM levels up to 7th or 9th order may be considered. Then, many aggregation combinations would result.

In the table below (Table 2), examples when IMD2 or IMD3 may affect a receive (Rx) channel of the PCell based on the location of UL channels are shown.

TABLE 2

| LTE Band (FDD) | NR Band (TDD) | IMD Order Falling in Rx Band |
|---|---|---|
| 1 | n77 | 2 |
| 3 | n77 | 2 |
| 3 | n78 | 2 |
| 28 | n50 | 2 |
| 20 | n28 | 3 |

Implementation of dual-UL is certainly possible at higher expense in terms of additional RF components, e.g., two TX digital front end, additional TX phase locked loop (PLL), additional TX measurement receiver, power management between two ULs (of different stacks), multiplexer filters needed after PA (duplexers replaced by multiplexers), isolation between the TX paths, etc.

One way of avoiding the IM problem is to use one single UL component carrier (CC) at any point of time as shown in FIG. 4. In this figure, the wireless device only transmits one single UL at any point of time to avoid the IM problem. Thus, single TX transmission is ensured. The technique can be used in any radio access technologies (RAT) or any combination of RATs, e.g., this is applicable for transmission for only LTE or NR or on both LTE and NR.

In a single TX operation, when more than one UL CC is configured, and UL transmissions are switched due to a single RF TX chain, transmission collisions may occur when the UL is switched. This is shown in FIG. 5. In this case, two UL CCs are in different timing advance groups (TAGs). We denote corresponding timing advance values as TA1 and TA2, respectively. If TA2>TA1, then the transmission of UL-CC2 needs to start before transmission of UL-CC1 stops.

A very large number of band combinations are being specified for LTE and NR dual connectivity (EN-DC) operation, see for example 3GPP TR 37.863-05-01 V0.0.1 (2017-10). Several of these band combinations may cause intermodulation (IMD) problems at the wireless device receiver, e.g., intermodulation distortion (IMD) generated by the UL of LTE in MCG and UL of NR in SCG. To avoid the IMD problem, some of these EN-DC combinations will employ only a single uplink transmission at a time. This means the wireless device will have to switch the single UL RF chain between LTE and NR UL transmissions.

SUMMARY

In existing system, wireless device behavior in terms of switching between one carrier of one cell to another carrier in another cell is not defined. For example, the wireless device behavior in terms of switching between the uplinks of LTE and NR is not defined. Without such wireless device behavior being defined, the network may not be able to efficiently schedule the wireless device. This in turn may lead to loss in wireless device UL throughput and also loss in the aggregated system throughput.

The instant disclosure advantageously solves at least a portion of at least one problem of existing systems by defining wireless device behavior related to switching between one carrier on one cell to another carrier on another cell. Some embodiments advantageously provide methods, systems, network nodes and wireless devices for switching of transmission of a wireless device from a first cell that is part of a first cell group to a second cell that is part of a second cell group based at least in part on a timing value.

According to one aspect of the disclosure, a network node is configured to provide a first cell on a first carrier and to communicate with a wireless device where the first cell is part of a first cell group is provided. The network node includes processing circuitry configured to: receive a transmission from a wireless device after a time period following a switching of a transmission from a second cell being part of a second cell group, the first cell group being different from the second cell group; and determine a timing value corresponding to the time period, the time value being associated at least in part with the second cell group. Various examples are provided in relation to this first aspect for determining the timing value and adapting the scheduling as a result.

According to another aspect of the disclosure, a method performed by a network node configured to provide a first cell on a first carrier and to communicate with a wireless device where the first cell being part of a first cell group is provided. A transmission is received from a wireless device after a time period following a switching of a transmission from a second cell being part of a second cell group, the first cell group being different from the second cell group. A timing value corresponding to the time period is determined where the time value being associated at least in part with the second cell group. Various examples are provided in relation to this second aspect for determining the timing value and adapting the scheduling as a result.

In one or more embodiments, the time period is determined by the network node in response to a message sent to the wireless device to instruct the wireless device to stop transmission in the second cell and start a new transmission in the first cell. In one or more embodiments, the first cell and the second cell are provided by a first network node and a second network node, respectively, and the wireless device is instructed to start the new transmission in the first cell at a reference time, Ty, by the second network node and the determining of the time period is based on the first network node receiving an indication of the reference time, Ty from the second network node.

In one or more embodiments, the timing value is based at least in part on a timing advance of the second cell group and a timing advance of the first cell group. In one or more embodiments, the timing value is based at least in part on a radio frequency, RF, switching time of the wireless device. In one or more embodiments, the timing value is a function of at least one of a radio frequency, RF, switching time of the wireless device, a timing advance of the first cell group and a timing advance of the second cell group. In one or more embodiments, the timing value is based at least in part on at least one of a sum, difference, maximum and product of at least two of: the RF switching time of the wireless device;

the timing advance of the first cell group; the timing advance of the second cell group; and the function of at least one of the RF switching time of the wireless device, the timing advance of the first cell group and the timing advance of the second cell group In one or more embodiments, the timing value is further based at least in part on an error due to one of reception and transmission at the wireless device. In one or more embodiments, the timing value is further based at least in part on an autonomous timing adjustment delay of the wireless device. In one or more embodiments, the first cell is associated with a first radio access technology, RAT, and the second cell is associated with a second RAT different from the first RAT. In one or more embodiments, the first cell and the second cell are provided by the network node. In one or more embodiments, the processing circuitry is further configured to adapt a scheduling of transmissions based at least in part on the time period.

According to another aspect of the disclosure, a network node configured to provide a first cell on a first carrier and to communicate with a wireless device where the first cell being part of a first cell group is provided. The network node includes processing circuitry configured to transmit a message configured to cause the wireless device to switch from transmission on the first carrier of the first cell to transmission on a second carrier of a second cell based at least in part on a timing value associated with the second cell, the second cell being part of a second cell group different from the first cell group.

According to another aspect of the disclosure, a method performed by a network node configured to provide a first cell on a first carrier and to communicate with a wireless device where the first cell being part of a first cell group is provided. A message configured to cause the wireless device (22) to switch from transmission on the first carrier of the first cell to transmission on a second carrier of a second cell based at least in part on a timing value associated with the second cell is transmitted. The second cell is part of a second cell group different from the first cell group.

In one or more embodiments, the message is one of a radio resource control message, medium access control message and layer 1 message. In one or more embodiments, the processing circuitry is further configured to determine a reference time, Ty, at which the wireless device is to start transmission on the second carrier of the second cell, the reference time, Ty, is indicated in the message. In one or more embodiments, the timing value is based at least in part on a timing advance of the second cell group and a timing advance of the first cell group. In one or more embodiments, the timing value is based at least in part on a radio frequency, RF, switching time of the wireless device.

In one or more embodiments, the timing value corresponds to a delay in uplink transmission, at least a portion of the delay in the uplink transmission being applied to at least one of an uplink transmission in the first cell and an uplink transmission in the second cell. In one or more embodiments, the timing value is a function of at least one of a radio frequency, RF, switching time of the wireless device, a timing advance of the first cell group and a timing advance of the second cell group. In one or more embodiments, the timing value is based at least in part on at least one of a sum, difference, maximum and product of at least two of: the RF switching time of the wireless device; the timing advance of the first cell group; the timing advance of the second cell group; and the function of at least one of the RF switching time of the wireless device, the timing advance of the first cell group and the timing advance of the second cell group. In one or more embodiments, the timing value is further based at least in part on an error due to one of reception and transmission at the wireless device.

In one or more embodiments, the timing value is further based at least in part on an autonomous timing adjustment delay of the wireless device. In one or more embodiments, the first cell and the second cell are provided by the network node. In one or more embodiments, the first cell is associated with a first radio access technology, RAT, and the second cell is associated with a second RAT different from the first RAT.

According to another aspect of the disclosure, a wireless device configured to communicate on a first carrier with a first cell that is part of a first cell group and on a second carrier with a second cell that is part of a second cell group different from the first cell group is provided. The wireless device includes processing circuitry configured to: determine a timing value, the timing value being associated with the first cell and second cell; stop a first transmission in the first cell on the first carrier; and switch to perform a second transmission in a second cell on the second carrier after a time period corresponding to the timing value.

According to another aspect of the disclosure, a method performed by a wireless device configured to communicate on a first carrier with a first cell that is part of a first cell group and on a second carrier with a second cell that is part of a second cell group different from the first cell group is provided. A timing value is determined where the timing value being associated with the first cell and second cell. A first transmission in the first cell on the first carrier is stopped. A second transmission in a second cell on the second carrier after a time period corresponding to the timing value is performed.

In one or more embodiments, the processing circuitry is further configured to receive a message from the first cell where the stopping of the first transmission in the first cell and the performing of the second transmission in the second cell being in response to the message. In one or more embodiments, the message includes an indication to apply at least a portion of a delay in transmission to at least one of an uplink transmission in the first cell and an uplink transmission in the second cell, the delay corresponding to the timing value. In one or more embodiments, the processing circuitry is further configured to determine whether a predefined rule is met, the stopping of the first transmission in the first cell and the performing of the second transmission in the second cell being in response to the predefined rule being met.

In one or more embodiments, the predefined rule is based on one of a numerology of a signal and predefined time period. In one or more embodiments, the message is one of a radio resource control message, medium access control message and layer 1 message. In one or more embodiments, the timing value is based at least in part on a timing advance of the second cell group and a timing advance of the first cell group. In one or more embodiments, the timing value is based at least in part on a radio frequency, RF, switching time of the wireless device. In one or more embodiments, the timing value is a function of at least one of a radio frequency, RF, switching time of the wireless device, a timing advance of the first cell group and a timing advance of the second cell group.

In one or more embodiments, the timing value is based at least in part on at least one of a sum, difference, maximum and product of at least two of: the RF switching time of the wireless device; the timing advance of the first cell group; the timing advance of the second cell group; and the function of at least one of the RF switching time of the wireless device, the timing advance of the first cell group and the timing advance of the second cell group. In one or more embodiments, the timing value is further based at least in part on an error due to one or reception and transmission at the wireless device. In one or more embodiments, the timing value is further based at least in part on an autonomous timing adjustment delay of the wireless device.

In one or more embodiments, the timing value is based on a timing advance of the second cell group and a timing advance of the first cell group. In one or more embodiments, the first cell and the second cell are provided by a network node. In one or more embodiments, the first cell is associated with a first radio access technology, RAT, and the second cell is associated with a second RAT different from the first RAT.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIGS. 2a-d illustrate deployment scenarios with NR base stations;

FIG. 11 is a flowchart illustrating exemplary methods implemented in a communication system including a host computer, a network node and a wireless device for executing a client application at a wireless device according to some embodiments of the present disclosure;

FIG. 12 is a flowchart illustrating exemplary methods implemented in a communication system including a host computer, a network node and a wireless device for receiving user data at a wireless device according to some embodiments of the present disclosure;

FIG. 13 is a flowchart illustrating exemplary methods implemented in a communication system including a host computer, a network node and a wireless device for receiving user data from the wireless device at a host computer according to some embodiments of the present disclosure FIG. 14 is a flowchart illustrating exemplary methods implemented in a communication system including a host computer, a network node and a wireless device for receiving user data at a host computer according to some embodiments of the present disclosure;

DETAILED DESCRIPTION

Figure 1:
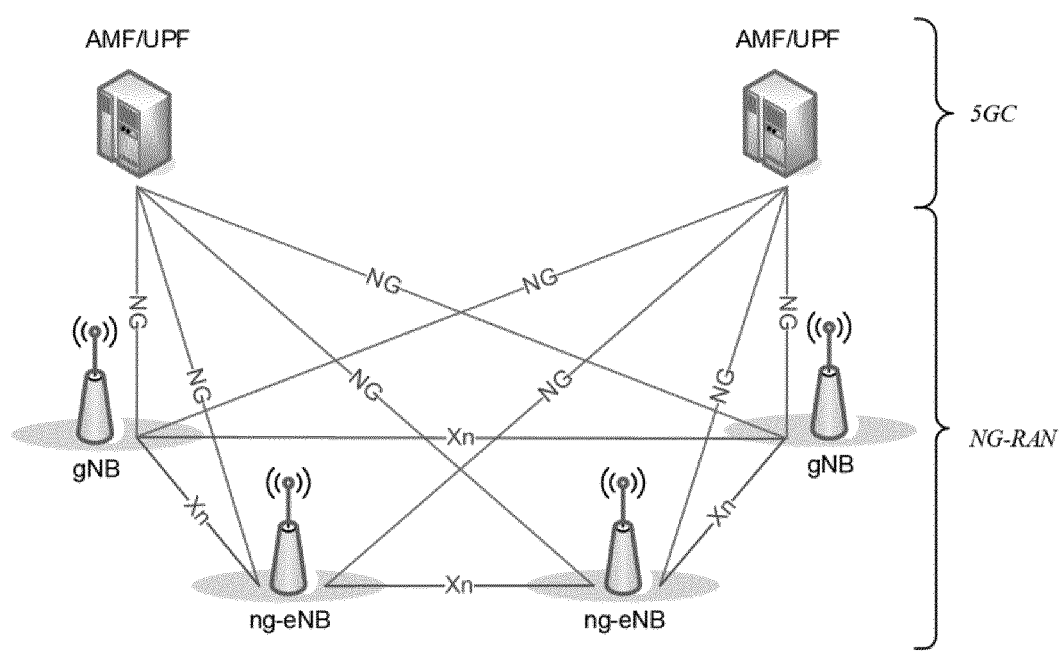
FIG. 1 is a block diagram of a New Radio (NR) wireless communication system.
Figure 3:
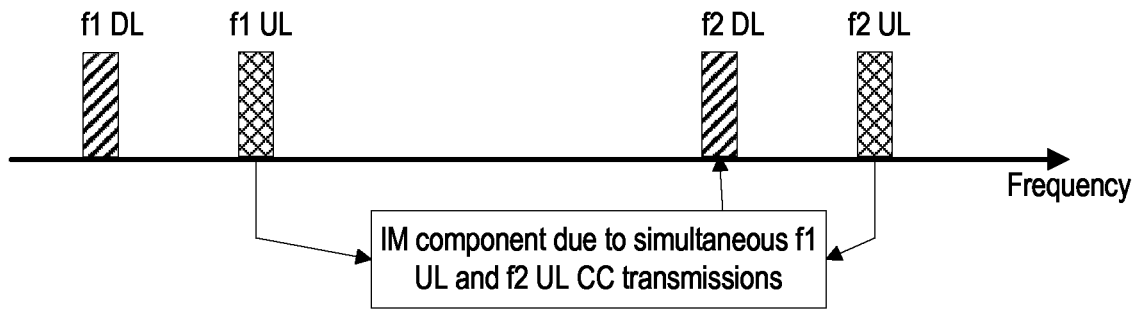
FIG. 3 illustrates intermodulation (IM) products in a downlink band.
Figure 4:
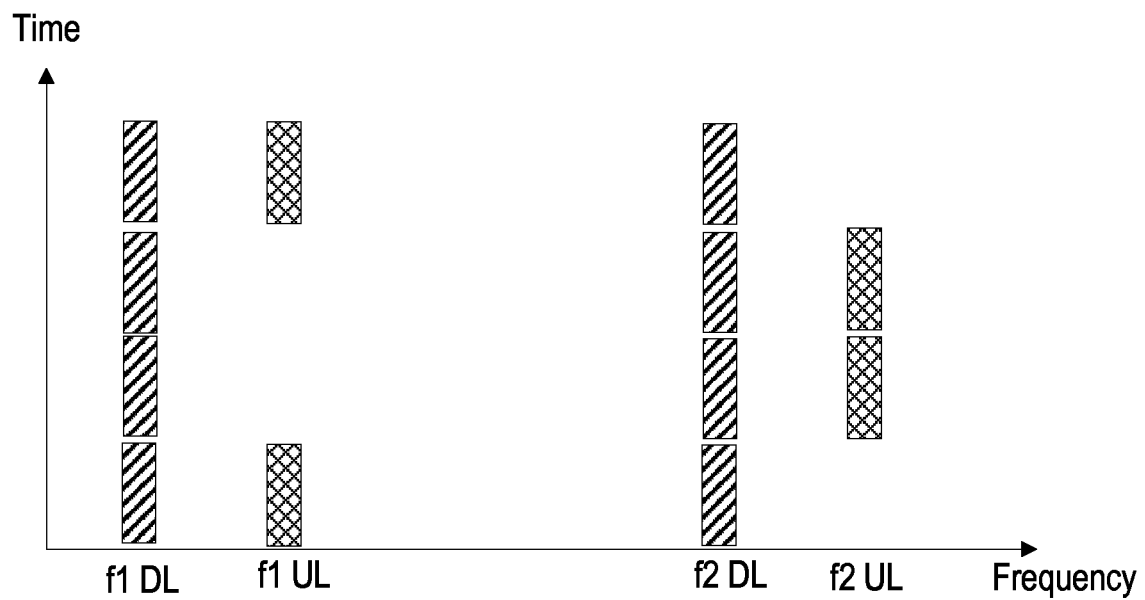
FIG. 4 illustrates avoidance of IM using a single uplink component carrier.
Figure 5:
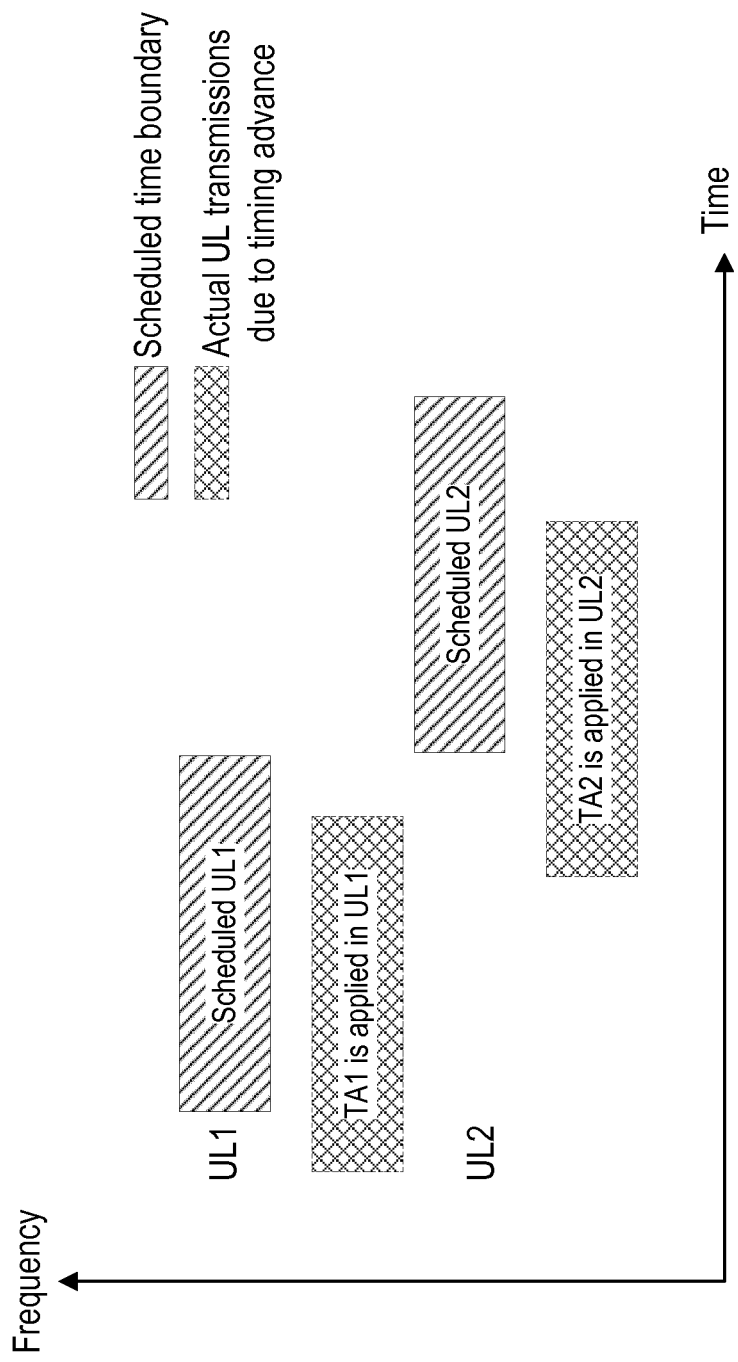
FIG. 5 illustrates a possibility of collisions when uplink transmissions are switched.

Some embodiments advantageously provide methods, systems, and apparatuses for adaptation of interruption time due to single transmit operation.

For example a wireless device may be configured for multi-connectivity operation (e.g., LTE and NR Dual connectivity (EN-DC)) and switches between uplink transmission in a first cell (cell1) belonging to a first timing advance group (TAG) (TAG1) (e.g., LTE TAG) and uplink transmission in a second cell (cell2) belonging to a second TAG (TAG2) (e.g., NR TAG) within a certain time delay (Td); where Td is a function of at least RF tuning time (Tr), a first TA advance (TA1) is applied by the wireless device for transmission in TAG1 and a second TA advance (TA2) is applied by the wireless device for transmission in TAG2. The value of Td may further include time to account for implementation margin (Tm) and time (Ta) for autonomous adjustment of the wireless device uplink timing in cell1 and/or cell2. The time delay, Td, corresponds to a total interruption time during which signals transmitted between the wireless device and a first network node (NW1) (e.g., eNB) and/or signals transmitted between the wireless device and a second network node (NW2) (e.g., gNB) are interrupted.

In a second example the wireless device may be configured with EN-DC and may determine whether the time delay, Td, occurs during uplink transmission of signals in TAG1 and/or during uplink transmission of signals in TAG2. The determination is based on one or more rules, which can be pre-defined and/or the determination is based on a configuration message received from the network node (e.g., from NW1 and/or NW2 or from another network node). The one or more rules can be based on: a type of signal transmitted in cell1 and/or in cell2, numerology of signals transmitted to cell1 and/or in cell2, etc.

In a third example a network node (NW) determines the total interruption time (Td), which is caused by the UE, when the wireless device is configured for multi-connectivity operation and switches between uplink transmission in cell1 of TAG1 and uplink transmission in cell2 of TAG2. The network node may adapt scheduling of signals in cell1 and/or in cell2 based on the determined value of Td.

Some advantages of some of the embodiments described further herein include:

- wireless device behavior in single TX transmission is well defined and thus provides known and consistent interoperability;
- The network node is able to schedule the wireless device with optimized resources which provides more optimized resource allocation performance; and/or
- The network node has better control over the wireless device operation in multicarrier operation since the interruption can be controlled, e.g., of either occurs in PCell or in PSCell or partially in both serving cells.

Before describing in further detail exemplary embodiments, it is noted that the embodiments reside primarily in combinations of apparatus components and processing steps related to adaptation of interruption time due to single transmit operation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a user equipment (UE) or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

A component carrier (CC) also interchangeably called a carrier, primary CC (PCC) or secondary CC (SCC) is configured at the wireless device by the network node using higher layer signaling e.g. by sending RRC configuration message to the UE. The configured CC is used by the network node for serving the wireless device 22 on the serving cell (e.g. on PCell, PSCell, SCell, etc.) of the configured CC. The configured CC is also used by the wireless device 22 for performing one or more radio measurements (e.g. RSRP, RSRQ, etc.) on the cells operating on the CC e.g. PCell, SCell or PSCell and neighboring cells. In some embodiments the wireless device 22 may be configured with PCell and PSCell or with PCell, PSCell and one or more SCells such as in carrier aggregation or dual connectivity. The configured cells are wireless device 22 specific and are also called as serving cells of the UE.

The term time resource used herein may correspond to any type of physical resource or radio resource expressed in terms of length of time. Examples of time resources are: symbol, time slot, subframe, radio frame, TTI, short or shortened TTI, interleaving time, special subframe, UpPTS, etc.

In this disclosure, switching between two UL cells are mentioned, however any switching between more than two cells are also covered under the embodiments, unless otherwise mentioned.

Note that although terminology from one particular wireless system, such as, for example, 3GPP LTE, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for adaptation of interruption time due to single transmit operation. For example, in some embodiments, a network node may transmit a message to the wireless device at a reference time, Ty, instructing the wireless device to stop transmission in a first cell on a first uplink carrier and start a new transmission in a second cell on a second uplink carrier. The network node may then receive a signal including the new transmission in the second cell on the second uplink carrier within a certain time Tz starting from the reference time, Ty. The network node determines a duration of an interruption based on Tz and determines the new transmission contained in the received signal based on the determined duration of the interruption. In one or more embodiments, one or more of the following may be an example of a timing value: Tz and a duration of an interruption. As another example, in some embodiments, a wireless device receives from the network node a message instructing the wireless device 22 to stop a first transmission in a first cell on a first uplink carrier and start a second transmission in a second cell on a second uplink carrier. The wireless device determines an interruption time, Td, being a function of a switching delay and first timing advance and a second timing advance. The wireless device is configured to stop the first transmission and start the second transmission such that the delay between the stopping and the starting does not exceed Td. In one or more embodiments, the interruption time is an example of a timing value.

Figure 6:
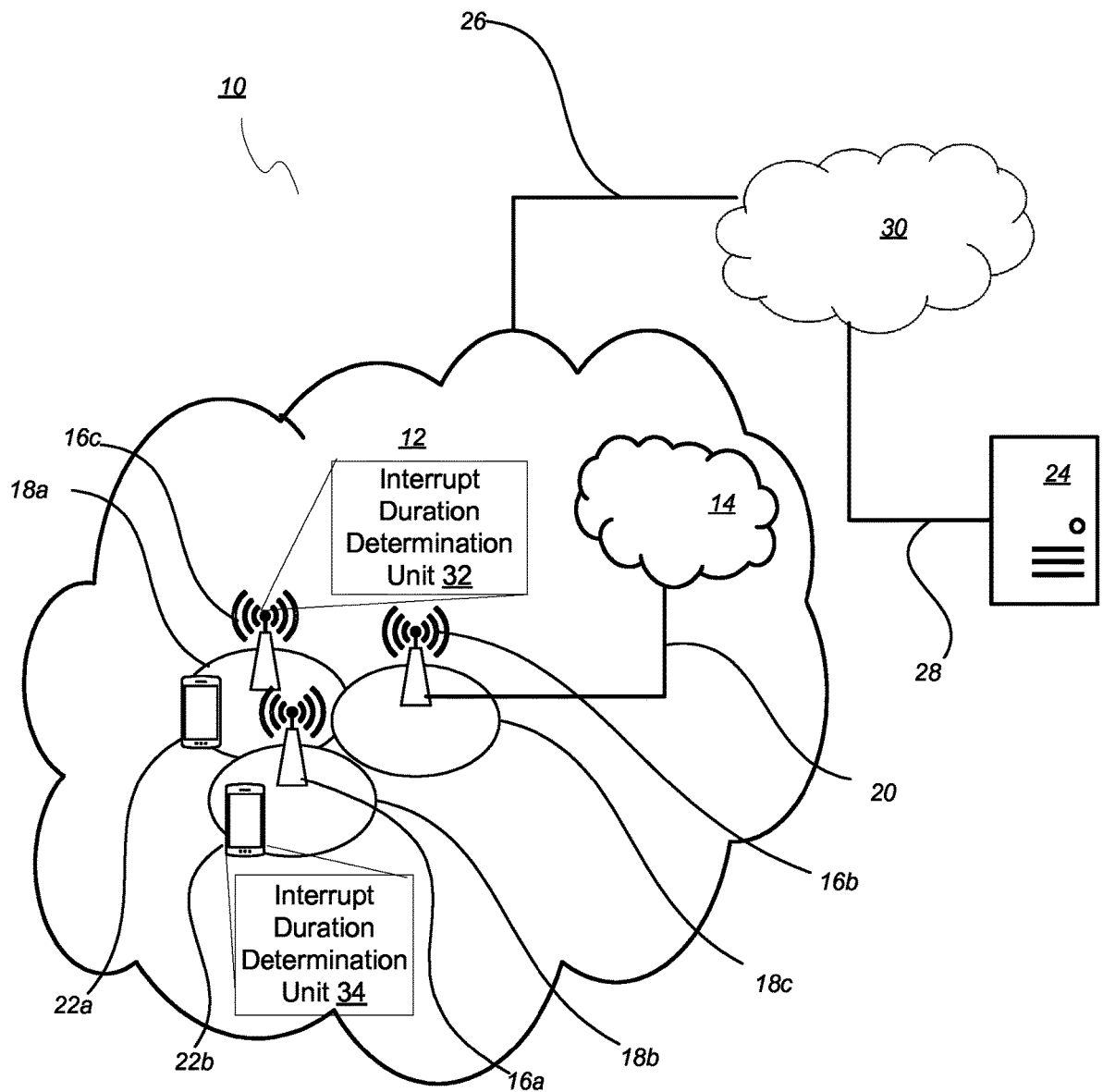
FIG. 6 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 6 a schematic diagram of a communication system, according to an embodiment, including a communication system 10, such as a 3GPP-type cellular network, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device 22 is in the coverage area or where a sole is connecting to the corresponding network node 16. Note that although only two wireless devices 22 and three network nodes 16 are shown for convenience, the communication system may include many more wireless devices 22 and network nodes 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 6 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include an interrupt duration determination unit 32 which is configured to perform one or more functions described herein such as determining a duration of an interruption between stopping a first transmission and starting a second transmission. A wireless device 22 is configured to include an interrupt duration determination unit 34 which is configured to perform one or more functions described herein such as determining an interruption time, Td, being a function of a switching delay and first timing advance and a second timing advance.

Example implementations, in accordance with an embodiment, of the wireless device 22, network node 16 and host computer 24 discussed in the preceding paragraphs will now be described with reference to FIG. 7. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to a traditional processor and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include an interrupt duration determination unit 32 configured to determine a duration of an interruption based on temporal parameter, Tz. The processing circuitry 68 may also include a transmission determination module 76 configured to determine the new transmission contained in the received signal based on the determined duration of the interruption.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to a traditional processor and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include an interrupt duration determination unit 34 configured to determine an interruption time, Td, being a function of a switching delay and first timing advance and a second timing advance. The processing circuitry 84 may also include switching unit 94 configured to stop the first transmission and start the second transmission such that the delay between the stopping and the starting does not exceed Td.

Figure 7:
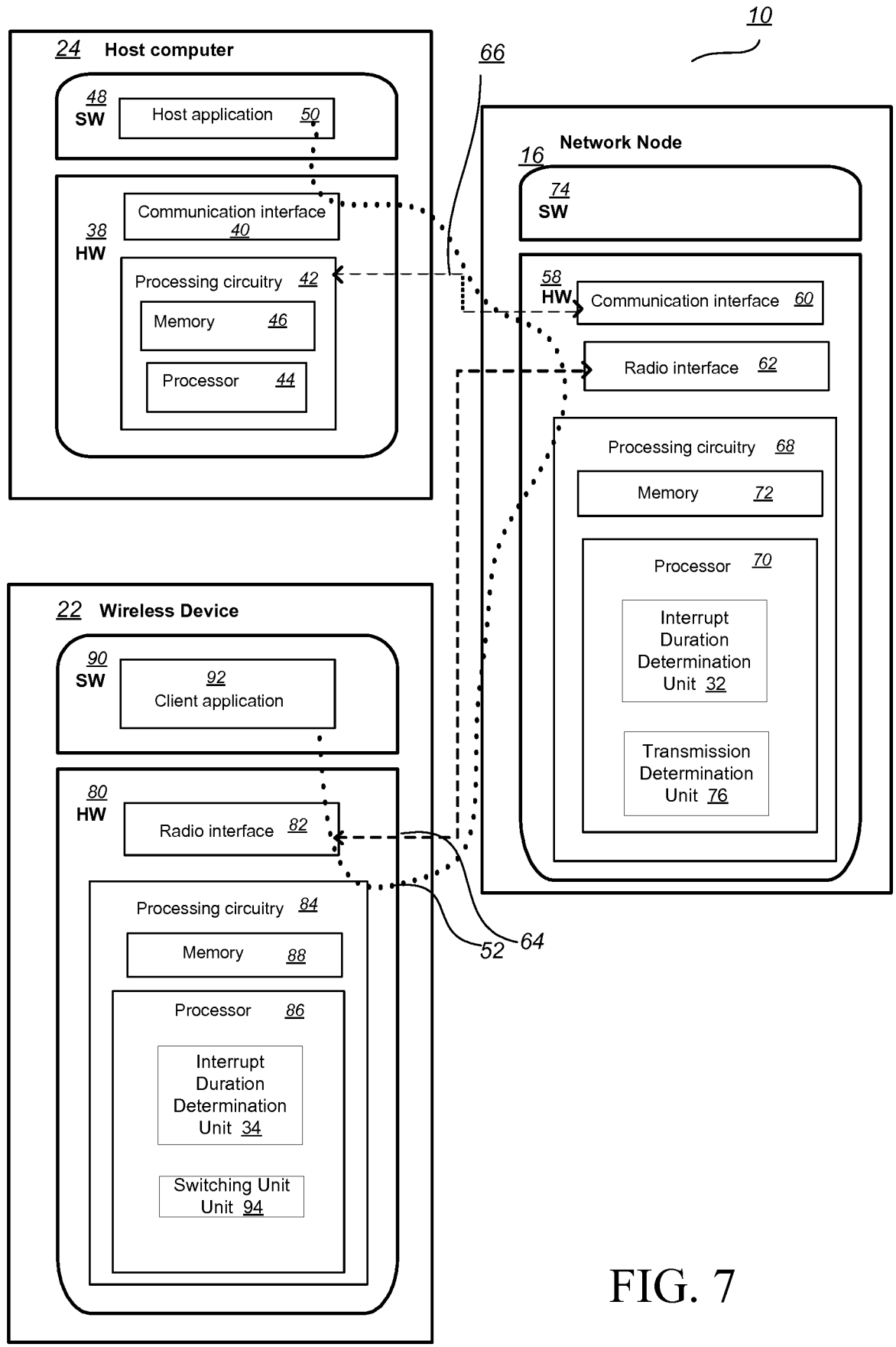
FIG. 7 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 7 and independently, the surrounding network topology may be that of FIG. 6.

In FIG. 7, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Although FIGS. 6 and 7 show various "units" such as interrupt duration determination unit 32, and interrupt duration determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 8:
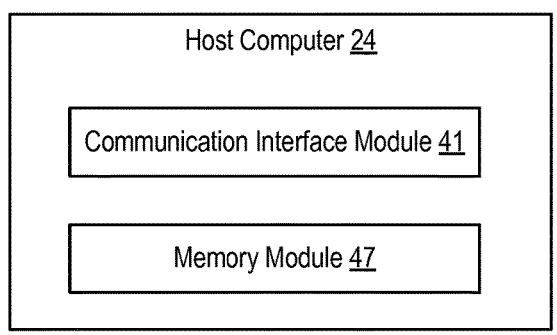
FIG. 8 is a block diagram of an alternative embodiment of a host computer according to some embodiments of the present disclosure.

FIG. 8 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein.

Figure 9:
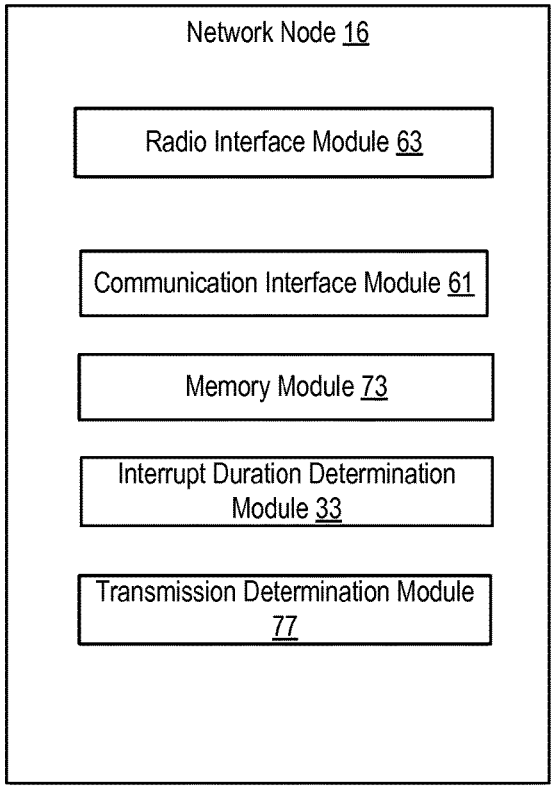
FIG. 9 is a block diagram of an alternative embodiment of a network node according to some embodiments of the present disclosure.

FIG. 9 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a wireless device 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The interrupt duration determination module 33 is configured to determine a duration of an interruption based on temporal parameter Tz, defined below. The transmission determination module 77 is configured to determine the new transmission contained in the received signal based on the determined duration of the interruption.

Figure 10:
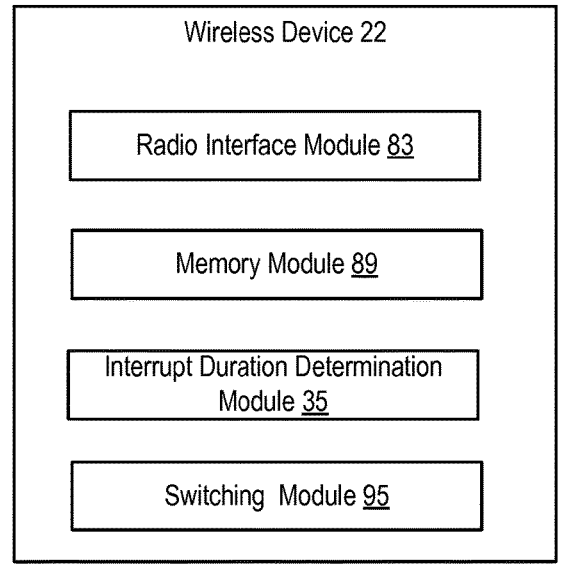
FIG. 10 is a block diagram of an alternative embodiment of a wireless device according to some embodiments of the present disclosure.

FIG. 10 is a block diagram of an alternative wireless device 22, which may be implemented at least in part by software modules containing software executable by a processor to perform the functions described herein. The wireless device 22 includes a radio interface module 83 configured to set up and maintain a wireless connection 64 with a network node 16 serving a coverage area 18 in which the wireless device 22 is currently located. The memory module 89 is configured to store data, programmatic software code and/or other information described herein. The interrupt duration determination module 35 is configured to determine an interruption time, Td, being a function of a switching delay and first timing advance and a second timing advance. The switching module 95 is configured to stop the first transmission and start the second transmission such that the delay between the stopping and the starting does not exceed Td.

FIG. 11 is a flowchart illustrating an exemplary method implemented in a communication system, such as, for example, the communication system of FIGS. 6 and 7, in accordance with one embodiment. The communication system may include a host computer 24, a network node 16 and a wireless device 22, which may be those described with reference to FIG. 7. In a first step of the method, the host computer 24 provides user data (Block S100). In an optional substep of the first step, the host computer 24 provides the user data by executing a host application, such as, for example, the host application 74 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 22 initiated, in accordance with the teachings of the embodiments described throughout this disclosure (Block S106). In an optional fourth step, the wireless device 22 executes a client application, such as, for example, the client application 114, associated with the host application 74 executed by the host computer 24 (Block S108).

FIG. 12 is a flowchart illustrating an exemplary method implemented in a communication system, such as, for example, the communication system of FIG. 6, in accordance with one embodiment. The communication system may include a host computer 24, a network node 16 and a wireless device 22, which may be those described with reference to FIGS. 6 and 7. In a first step of the method, the host computer 24 provides user data (Block S110). In an optional substep (not shown) the host computer 24 provides the user data by executing a host application, such as, for example, the host application 74. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

FIG. 13 is a flowchart illustrating an exemplary method implemented in a communication system, such as, for example, the communication system of FIG. 6, in accordance with one embodiment. The communication system may include a host computer 24, a network node 16 and a wireless device 22, which may be those described with reference to FIGS. 6 and 7. In an optional first step of the method, the wireless device 22 receives input data provided by the host computer 24 (Block S116). In an optional substep of the first step, the wireless device 22 executes the client application 114, which provides the user data in reaction to the received input data provided by the host computer 24 (Block S118). Additionally or alternatively, in an optional second step, the wireless device 22 provides user data (Block S120). In an optional substep of the second step, the wireless device 22 provides the user data by executing a client application, such as, for example, client application 114 (Block S122). In providing the user data, the executed client application 114 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

FIG. 14 is a flowchart illustrating an exemplary method implemented in a communication system, such as, for example, the communication system of FIG. 6, in accordance with one embodiment. The communication system may include a host computer 24, a network node 16 and a wireless device 22, which may be those described with reference to FIGS. 6 and 7. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 15:
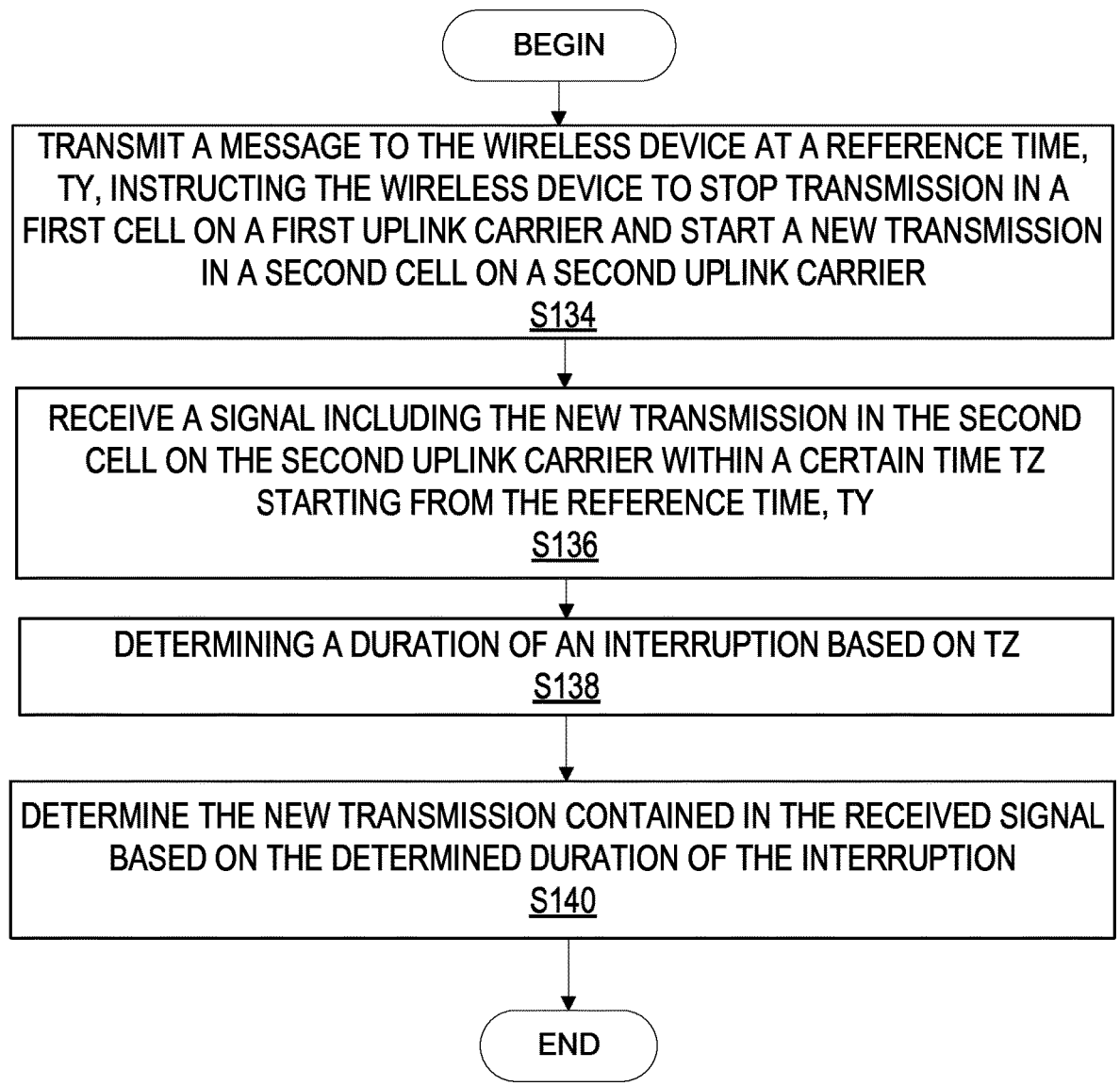
FIG. 15 is a flowchart of an exemplary process in a network node configured to communicate with a wireless device according to some embodiments of the present disclosure.

FIG. 15 is a flowchart of an exemplary process in a network node 16 for communicating with a wireless device. The process includes transmitting, via the radio interface 62, a message to the wireless device at a reference time, Ty, instructing the wireless device to stop transmission in a first cell on a first uplink carrier and start a new transmission in a second cell on a second uplink carrier (Block S134). The process includes receiving, via the radio interface 62, a signal including the new transmission in the second cell on the second uplink carrier within a certain time Tz starting from the reference time, Ty (Block S136). The process also includes determining, via the interrupt duration determination unit 32, a duration of an interruption based on Tz (Block S138). The process also includes determining, via the transmission determination unit 76, the new transmission contained in the received signal based on the determined duration of the interruption (Block S140). For example, determining the start of an UL data transmission within a detected UL signal. In one or more embodiments, Tz and/or the duration of the interruption time are one or more examples of one or more timing values that may be associated with one or more cells, cell groups and/or timing advance groups. While FIG. 15 is described with respect to a network node 16 that provides both a first cell and a second cell (i.e., provides multiple cell groups), in one or more embodiments, Blocks S134 and S136 are performed by different network nodes 16 such that a first network node 16 providing a first cell instructs the wireless device 22, as described above, and the second network node 16 providing a second cell receives the new transmission. In one or more embodiments, the first network node 16 and second network node 16 may communicate information with each other via an X2 interface such as timing information of one or more cells.

Figure 16:
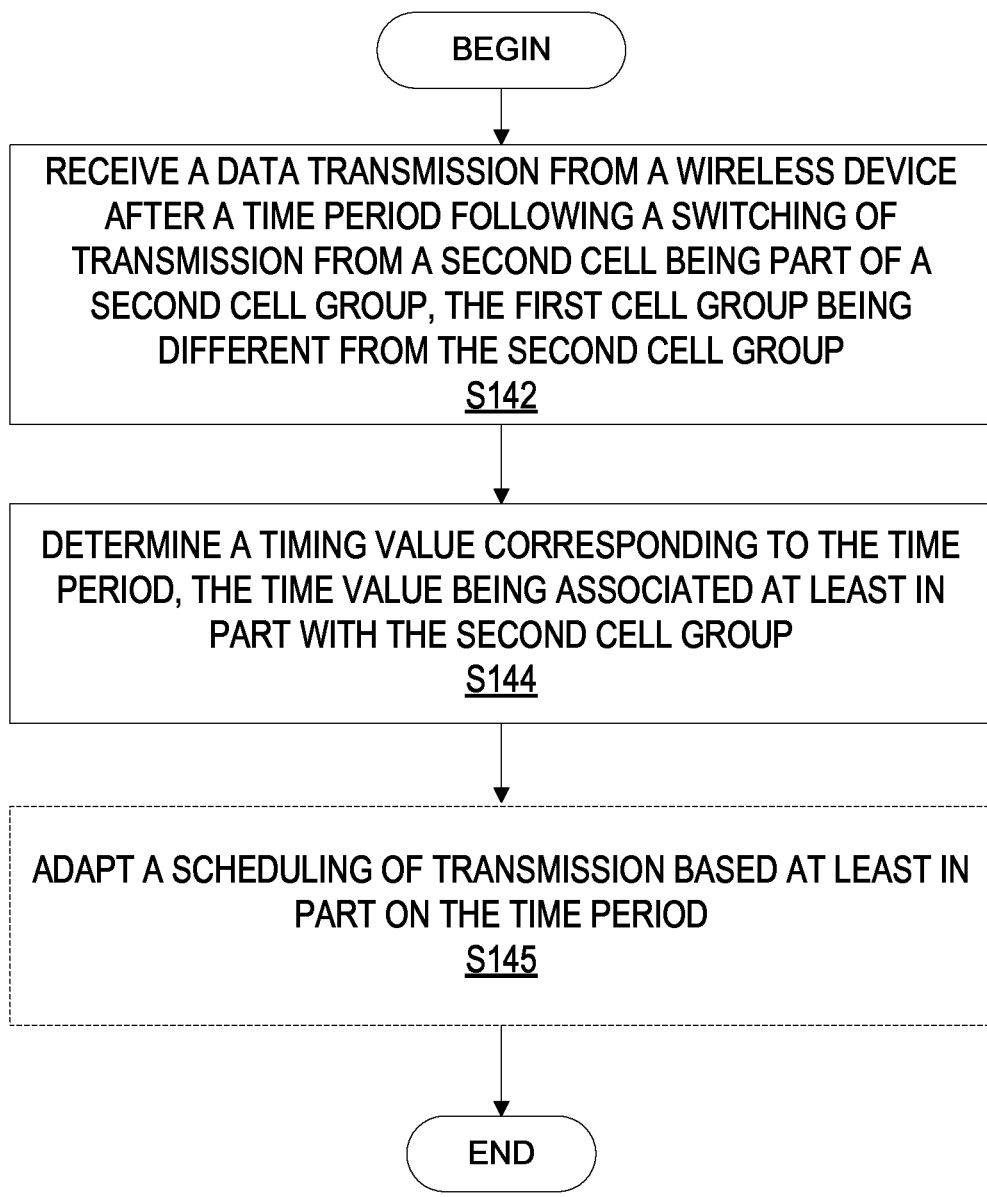
FIG. 16 is a flowchart of another exemplary process in a network node according to some embodiments of the present disclosure.

FIG. 16 is a flowchart of another exemplary process in a network node 16. One or more Blocks and/or functions performed by network node 16 may be performed by one or more elements of network node 16 such as by interrupt duration determination unit 32 and/or transmission determination unit 76 in processing circuitry 68, processor 70, radio interface 62, etc. In one or more embodiments, network node 16 such as via one or more of processing circuitry 68, processor 70, communication interface 60 and radio interface 62 is configured to receive (Block S142) a transmission from a wireless device (22) after a time period following a switching of a transmission from a second cell being part of a second cell group, the first cell group being different from the second cell group. The network node 16 may be in control of both the first cell group and the second cell group. In other examples the network node 16 is only in control of the first cell group and the second cell group is controlled by a different network node 16. In one or more embodiments, network node 16 such as via one or more of processing circuitry 68, processor 70, communication interface 60 and radio interface 62 is configured to determine (Block S144) a timing value corresponding to the time period, the time value being associated at least in part with the second cell group.

In one or more embodiments, the time period is determined by the network node 16 in response to a message sent to the wireless device 22 to instruct the wireless device 22 to stop transmission in the second cell and start a new transmission in the first cell. In one or more embodiments, the first cell and the second cell are provided by a first network node 16 and a second network node 16, respectively, and the wireless device 22 is instructed to start the new transmission in the first cell at a reference time, Ty, by the second network node 16 and the determining of the time period is based on the first network node 16 receiving an indication of the reference time, Ty from the second network node 16.

In one or more embodiments, the timing value is based at least in part on a timing advance of the second cell group and a timing advance of the first cell group. In one or more embodiments, the timing value is based at least in part on a radio frequency, RF, switching time of the wireless device 22. In one or more embodiments, the timing value is a function of at least one of a radio frequency, RF, switching time of the wireless device 22, a timing advance of the first cell group and a timing advance of the second cell group. In one or more embodiments, the timing value is based at least in part on at least one of a sum, difference, maximum and product of at least two of: the RF switching time of the wireless device 22; the timing advance of the first cell group; the timing advance of the second cell group; and the function of at least one of the RF switching time of the wireless device 22, the timing advance of the first cell group and the timing advance of the second cell group In one or more embodiments, the timing value is further based at least in part on an error due to one of reception and transmission at the wireless device 22. In one or more embodiments, the timing value is further based at least in part on an autonomous timing adjustment delay of the wireless device 22. In one or more embodiments, the first cell is associated with a first radio access technology, RAT, and the second cell is associated with a second RAT different from the first RAT In one or more embodiments, the processing circuitry 68 is further configured to adapt (Block S145) a scheduling of transmissions based at least in part on the time period and/or the timing value.

Figure 17:
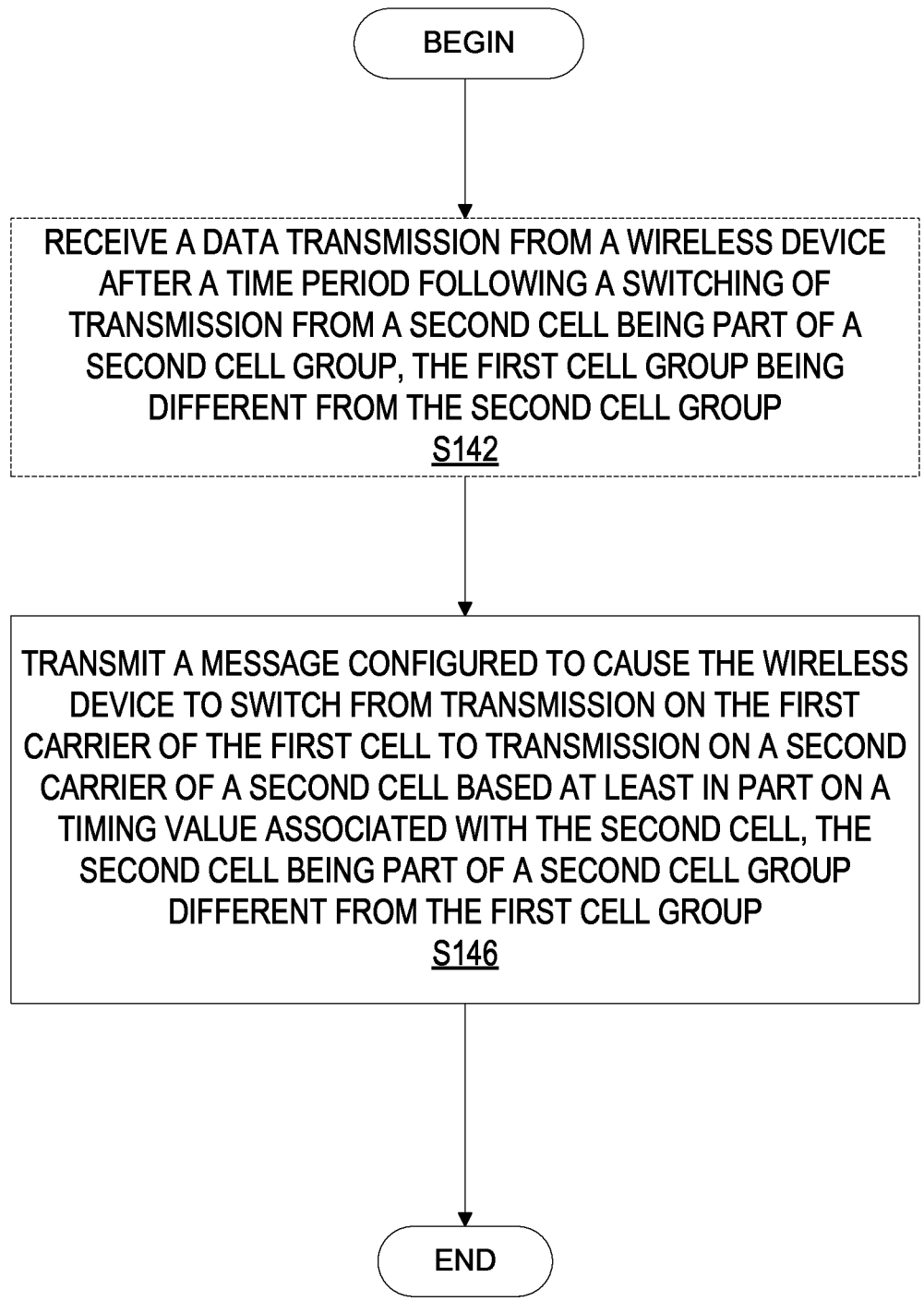
FIG. 17 is a flowchart of yet another exemplary process in a network node according to some embodiments of the present disclosure.

FIG. 17 is a flowchart of yet another exemplary process in a network node 16. One or more Blocks and/or functions performed by network node 16 may be performed by one or more elements of network node 16 such as by interrupt duration determination unit 32 and/or transmission determination unit 76 in processing circuitry 68, processor 70, radio interface 62, etc. In one or more embodiments, network node 16 such as via one or more of processing circuitry 68, processor 70, communication interface 60 and radio interface 62 is configured to transmit (Block S146) a message configured to cause the wireless device (22) to switch from transmission on the first carrier of the first cell to transmission on a second carrier of a second cell based at least in part on a timing value associated with the second cell, the second cell being part of a second cell group different from the first cell group. The network node 16 may be in control of both the first cell group and the second cell group. In other examples the network node 16 is only in control of the first cell group and the second cell group is controlled by a different network node 16.

In one or more embodiments, the message is one of a radio resource control message, medium access control message and layer 1 message. In one or more embodiments, the processing circuitry 68 is further configured to determine a reference time, Ty, at which the wireless device 22 is to start transmission on the second carrier of the second cell, the reference time, Ty, is indicated in the message. In one or more embodiments, the timing value is based at least in part on a timing advance of the second cell group and a timing advance of the first cell group. In one or more embodiments, the timing value is based at least in part on a radio frequency, RF, switching time of the wireless device 22.

In one or more embodiments, the timing value corresponds to a delay in uplink transmission, at least a portion of the delay in the uplink transmission being applied to at least one of an uplink transmission in the first cell and an uplink transmission in the second cell. In one or more embodiments, the timing value is a function of at least one of a radio frequency, RF, switching time of the wireless device 22, a timing advance of the first cell group and a timing advance of the second cell group. In one or more embodiments, the timing value is based at least in part on at least one of a sum, difference, maximum and product of at least two of: the RF switching time of the wireless device 22; the timing advance of the first cell group; the timing advance of the second cell group; and the function of at least one of the RF switching time of the wireless device 22, the timing advance of the first cell group and the timing advance of the second cell group. In one or more embodiments, the timing value is further based at least in part on an error due to one of reception and transmission at the wireless device 22.

In one or more embodiments, the timing value is further based at least in part on an autonomous timing adjustment delay of the wireless device 22. In one or more embodiments, the first cell is associated with a first radio access technology, RAT, and the second cell is associated with a second RAT different from the first RAT.

While FIGS. 16 and 17 are described as separate processes, in one or more embodiments, FIGS. 16 and 17 may be performed by a network node 16 that provides both the first cell and the second cell. For example, in a single network node 16, the process may be performed in the following order: Block S146, Block S142, Block S144 and Block S145, where one or more Blocks may overlap or optionally be skipped.

In one or more embodiments, network node 16 schedules an UL transmission on a second cell to a wireless device 22 that is currently operating in the first cell, where the scheduling is determined based at least in part on a time delay in switching, as described herein. The scheduling may include transmission of a message and/or command message related to switching as described herein.

Figure 18:
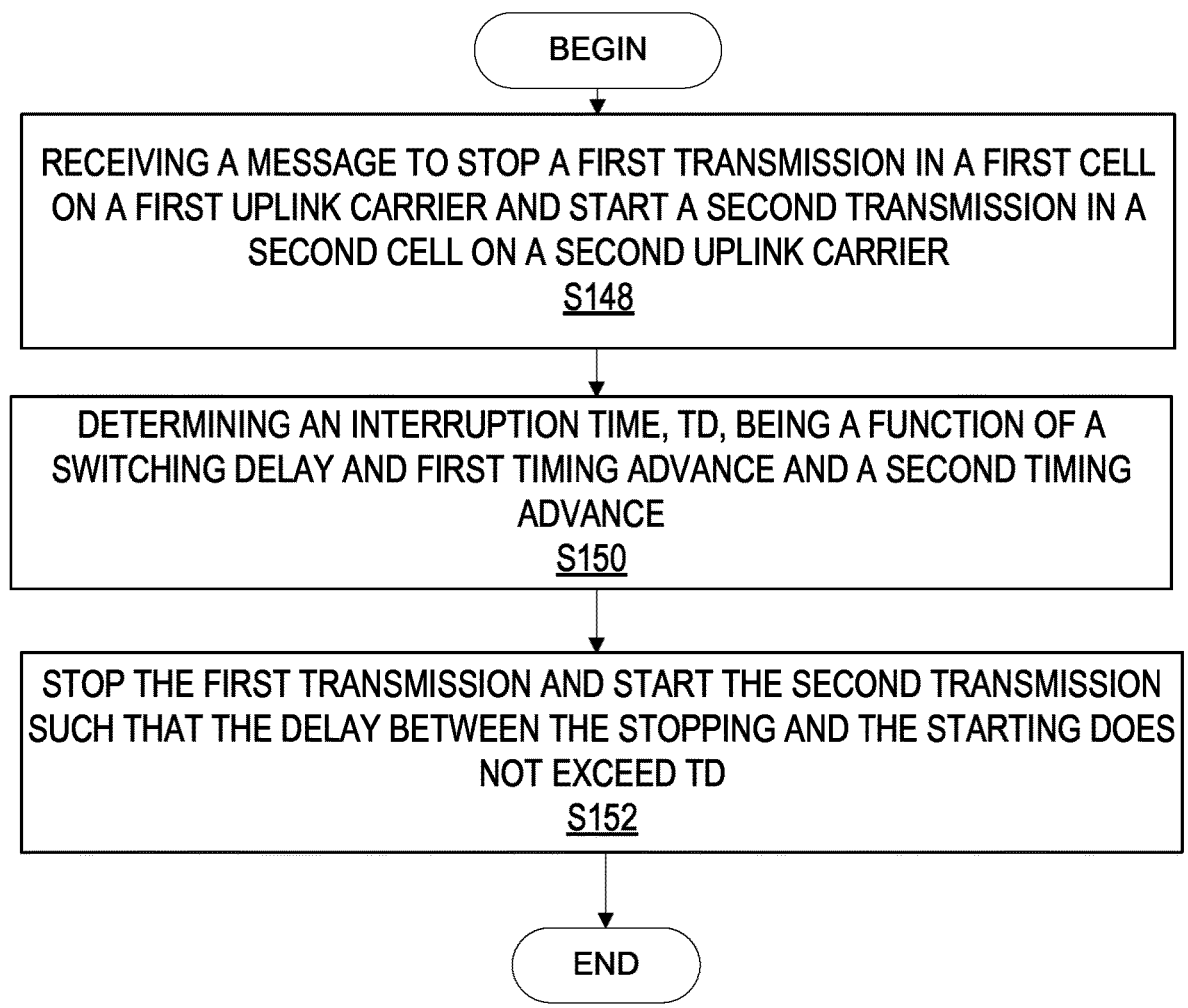
FIG. 18 is a flowchart of an exemplary process in a wireless device configured to communicate with a network node according to some embodiments of the present disclosure.

FIG. 18 is a flowchart of an exemplary process in a wireless device 22 for communication with a network node 16. The process includes receiving, via the radio interface 82, from the network node 16 a message instructing the wireless device 22 to stop a first transmission in a first cell on a first uplink carrier and start a second transmission in a second cell on a second uplink carrier (Block S148). The process also includes determining, via the interrupt duration determination unit 34, an interruption time, Td, being a function of a switching delay and first timing advance and a second timing advance (Block S150). The process also includes, via the switching unit 94, stopping the first transmission and starting the second transmission such that the delay between the stopping and the starting does not exceed Td (Block S152).

One scenario may occur when a wireless device 22 is configured for multi-connectivity operation involving at least two cell groups, e.g., a first cell group (CG1) and a second cell group (CG2). The wireless device 22 is configured with at least one serving cell in each of the configured CGs. For example, the wireless device 22 is configured with at least a first cell (cell1) in CG1 and a second cell (cell2) in CG2. Examples of cell1 and cell2 are PCell and PSCell respectively. Other examples of cell1 and cell2 are PSCell and PCell respectively. One or more cells belonging to each cell group are managed or configured or operated by one network node 16. For example, cells belonging to CG1 and cells belonging to CG2 are managed or configured or operated by a first network node 16 (NW1) and a second network node 16 (NW2), respectively. Cells in the same CG are associated with the same timing advance group (TAG). Cells within the same TAG transmit signals using the same TA value. For example, cells in CG1 and CG2 are associated with TAG1 and TAG2, respectively. The wireless device 22 uses a first timing advance value (TA1) and a second timing advance value (TA2) for transmitting signals on cells (e.g. cell1) in TAG1 and on cells (e.g. cell2) in TAG2, respectively. One of the TAGs is called as pTAG corresponding to a PCell, while other TAGs are called sTAG corresponding to at least one PSCell. The values of TA1 and TA2 are received by the wireless device 22 from the network node 16, e.g., TA1 is received from NW1 and TA2 is received from NW2.

Figure 19:
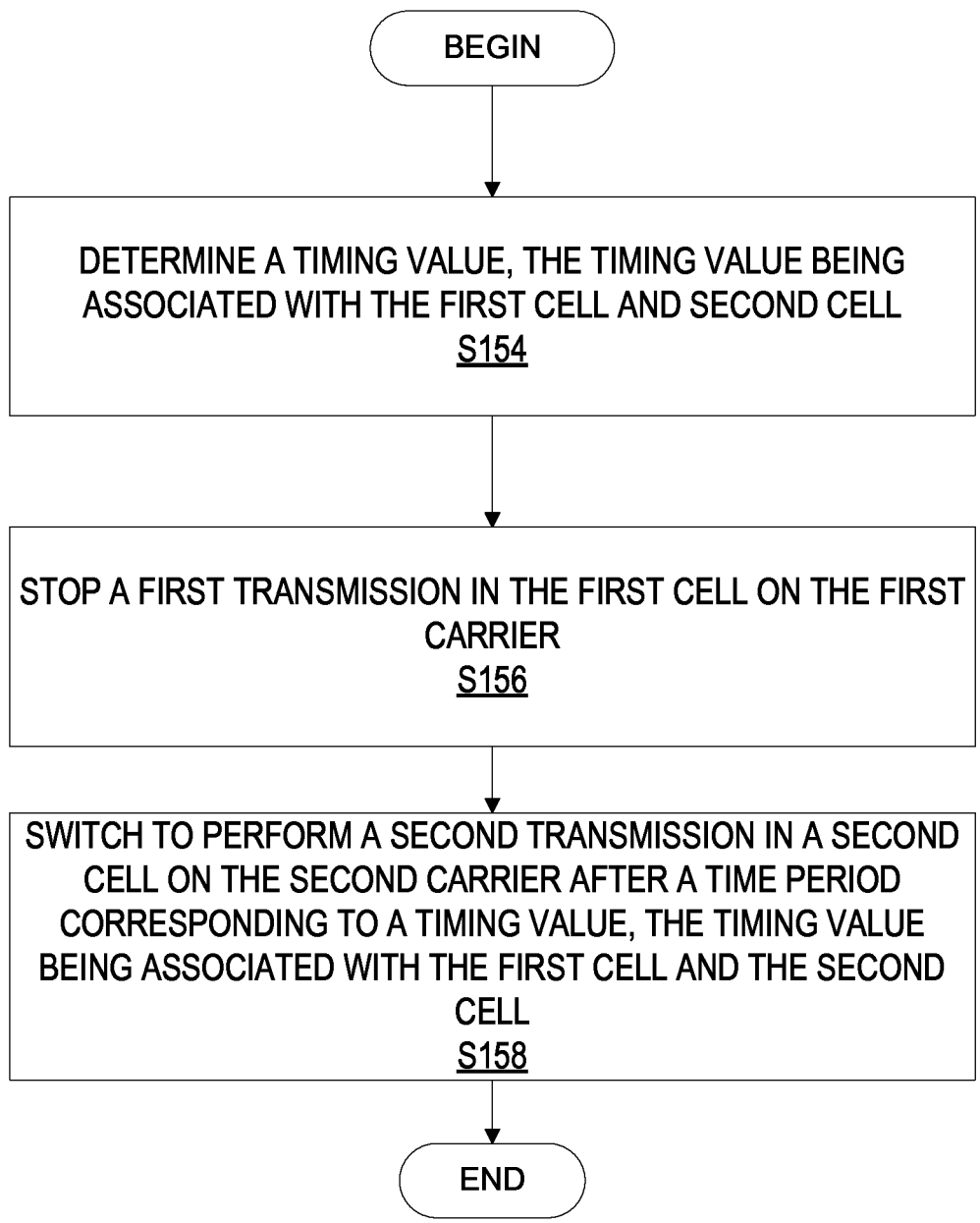
FIG. 19 is a flowchart of an exemplary process in a wireless device according to some embodiments of the present disclosure.

FIG. 19 is a flowchart of another exemplary process in a wireless device 22. One or more Blocks and/or functions performed by wireless device 22 may be performed by one or more elements of wireless device 22 such as by interrupt duration determination unit 34 and/or switching unit 94 in processing circuitry 84, processor 86, radio interface 82, etc. In one or more embodiments, wireless device 22 such as via one or more of processing circuitry 84, processor 86 and radio interface 82 is configured to determine (Block S154) a timing value, the timing value being associated with the first cell and second cell. In one or more embodiments, wireless device 22 such as via one or more of processing circuitry 84, processor 86 and radio interface 82 is configured to stop (Block S156) a first transmission in the first cell on the first carrier. In one or more embodiments, wireless device 22 such as via one or more of processing circuitry 84, processor 86 and radio interface 82 is configured to switch (Block S158) to perform a second transmission in a second cell on the second carrier after a time period corresponding to a timing value, the timing value being associated with the first cell and the second cell.

In one or more embodiments, the processing circuitry 84 is further configured to receive a message from the first cell where the stopping of the first transmission in the first cell and the performing of the second transmission in the second cell being in response to the message. In one or more embodiments, the message includes an indication to apply at least a portion of a delay in transmission to at least one of an uplink transmission in the first cell and an uplink transmission in the second cell, the delay corresponding to the timing value. In one or more embodiments, the processing circuitry 84 is further configured to determine whether a predefined rule is met, the stopping of the first transmission in the first cell and the performing of the second transmission in the second cell being in response to the predefined rule being met.

In one or more embodiments, the predefined rule is based on one of a numerology of a signal and predefined time period. In one or more embodiments, the message is one of a radio resource control message, medium access control message and layer 1 message. In one or more embodiments, the timing value is based at least in part on a timing advance of the second cell group and a timing advance of the first cell group. In one or more embodiments, the timing value is based at least in part on a radio frequency, RF, switching time of the wireless device 22. In one or more embodiments, the timing value is a function of at least one of a radio frequency, RF, switching time of the wireless device 22, a timing advance of the first cell group and a timing advance of the second cell group.

In one or more embodiments, the timing value is based at least in part on at least one of a sum, difference, maximum and product of at least two of: the RF switching time of the wireless device 22; the timing advance of the first cell group; the timing advance of the second cell group; and the function of at least one of the RF switching time of the wireless device 22, the timing advance of the first cell group and the timing advance of the second cell group. In one or more embodiments, the timing value is further based at least in part on an error due to one or reception and transmission at the wireless device 22. In one or more embodiments, the timing value is further based at least in part on an autonomous timing adjustment delay of the wireless device 22.

In one or more embodiments, the timing value is based on a timing advance of the second cell group and a timing advance of the first cell group. In one or more embodiments, the first cell and the second cell are provided by a network node 16. In one or more embodiments, the first cell is associated with a first radio access technology, RAT, and the second cell is associated with a second RAT different from the first RAT.

Having generally described arrangements for adaptation of interruption time due to single transmit operation and/or switching transmission of a wireless device 22 from a first carrier of a first cell to a second carrier of a second cell, details for these arrangements, functions and processes are provided as follows, and which may be implemented by the network node 16, wireless device 22 and/or host computer 24. One example of multi-connectivity operation is a multi-connectivity operation involving cells of different RATs, e.g., one or more cells of a first RAT (RAT1) and one or more cells of a second RAT (RAT2). Another example of multi-connectivity operation is a multi-connectivity operation involving the same RAT. Examples of RAT1 and RAT2 are LTE and NR respectively. A special case of multi-connectivity operation is dual connectivity (DC). An example of dual connectivity (DC) is LTE-NR DC (E-UTRA-NR DC (E-N DC)) where CG1 (e.g. LTE CG) and CG2 (e.g. NR CG) are operated or managed by NW1 and NW2, respectively, e.g., NW1 and NW2 are eNode B and gNode B respectively. In one example of E-N DC, the master node is eNode B and secondary node is gNode B. In this case MCG contains LTE cells while SCG contains NR cells. Furthermore, in this example, the TAG belonging to MCG is pTAG containing LTE cells, while the TAG belonging to SCG is sTAG containing NR cells. In another example of E-N DC, the master node is gNode B and secondary node is eNode B. In this case SCG contains LTE cells while MCG contains NR cells. Furthermore, in this example, the TAG belonging to MCG is pTAG containing NR cells, while the TAG belonging to SCG is sTAG containing LTE cells. In one or more embodiments, the master node and secondary node are two different network nodes 16 that provide respective cells. In one or more embodiments, the master node and secondary node are the same network node 16 that provides respective cells.

In some embodiments, the wireless device 22 is capable of one uplink transmission at a time. This means the wireless device 22 is not allowed to transmit signals in uplink simultaneously in two or more cells. This simultaneous transmission may not be allowed especially if the cells belong to different bands and, in particular, the transmission on these bands will cause an IMD problem. The IMD problem degrades the wireless device 22 reception quality or may even block the wireless device 22 receiver from successfully decoding the received signals.

In multi-connectivity, the wireless device 22 is required to transmit in at least one cell of each CG. Therefore, in case of a single uplink transmission at a time (e.g. non-simultaneous UL), the wireless device 22 may switch between uplink transmission in cell1 (e.g., PCell belonging to LTE TAG such as pTAG) and uplink transmission in cell2 (e.g. PSCell belonging to NR TAG such as sTAG) within a certain time delay (Td).

A method in a wireless device 22 configured with multi-connectivity operation may include the following steps:
  Step-1: Obtaining information to switch uplink transmission of signals between cell1 and cell2 operating on a first UL carrier (UL-CC1) and a second UL carrier (UL-CC2), respectively;
  Step-2: Determining an interruption time (Td) (which may be an example of a timing value) for switching uplink transmission of signals between cell1 and cell2, where Td is function of at least RF switching delay, TA1 and TA2 respectively, which may be one or more examples of a timing value and/or timing parameter; and
  Step-3: Transmitting signals in cell1 and/or cell2 while interrupting the signals transmitted between the wireless device 22 and cell1 and/or between the wireless device 22 and cell2 over a duration which does not exceed Td. In one or more embodiments, the interruption time corresponds to a delay between stopping transmission on a first carrier in a first cell and starting transmission on second carrier in a second cell where at least a portion of this delay may be applied to the transmission in the first cell and/or second cell. In one or more embodiments, this delay corresponds to a delay between consecutive UL transmissions from the wireless device 22. These steps are discussed in further detail below.

Step 1
In this step, the wireless device 22 may obtain information that the wireless device 22 has to switch uplink transmission of signals between cell1 and cell2 operating on or belonging to a first UL carrier (UL-CC1) and a second UL carrier (UL-CC2), respectively. The wireless device 22 may obtain this information based on any one or more of:

a pre-defined rule. For example, it can be pre-defined that the wireless device 22 has to switch the uplink transmission after a certain time period, e.g., once every N number of slots or M number of frames, or periodically, or whenever the wireless device 22 has to transmit signals in the UL on any cell, or based on a timer such as the wireless device 22 is not allowed to transmit in etc.; and/or
  information received from a network node 16 (e.g., NW1, NE2 or another network node 16). For example, the received information is based on a command or message. Examples of the command or the message are RRC message, MAC command, L1 message (e.g. DCI, etc.). In one or more embodiments, the information is received in a message that is configured to cause the wireless device 22 to switch from transmission on the first carrier of the first cell to transmission on a second carrier on a second cell based at least in part on a timing value associated with the second cell, as described herein.

In one example based on the obtained information, the wireless device 22 may stop transmission of signals in cell1 at a certain time instance and starts transmission of signals in cell2 at the same or different time instance. In another example, based on the obtained information the wireless device 22 may stop transmission of signals in cell2 at a certain time instance and starts transmission of signals in cell1 at the same or different time instance. In one or more embodiments, the information may include additional data used by the wireless device 22 for determining an interruption time (Td) described below, where the additional data may include an indication of the interruption time and/or other timing parameters described herein.

Step 2
While switching the uplink transmission of signals between cell1 and cell2, there may be interruption of signals transmitted between the wireless device 22 and cell1 and/or between the wireless device 22 and cell2. The interruption may also occur on signals transmitted between: the wireless device 22 and the DL of cell1 and/or the wireless device 22 and the DL of cell2. The interruption may also occur on signals transmitted between: the wireless device 22 and one or more additional cells (i.e., other than cell1) belonging to CG1 and/or between the wireless device 22 and one or more additional cells (i.e., other than cell2) belonging to CG2.

The maximum duration over which the interruption occurs may not exceed the time period (Td). This interruption time (Td) (i.e., an example of a timing value), due to switching uplink transmission of signals between cell1 and cell2, may be a function of at least the following parameters:
  wireless device 22 RF switching time (Tr);
  a first timing advance (TA1) in TAG1; and
  a second timing advance (TA2) in TAG2.

Examples of Tr are 0 µs, 50 µs, 100 µs, 200 µs, 900 µs, 1000 µs, etc. Examples of TA1 and TA2 are 0, 1 µs, 2 µs, 15 µs, 17 µs, etc. One or more of these parameters are one or more examples of one or more timing values where Td is a timing value that is based on one or more other timing values, for example.

The interruption time, Td, can be expressed by a function of parameters Tr, TA1 and TA2. Examples of function are sum, maximum, product. etc. The Td can be expressed in a suitable time unit, e.g., in seconds, ms, µs, or other basic time unit. Examples of basic time units are Ts, Tc, etc., where 1 Ts=32.55 ns and 1 Tc=Ts/64.

An example of a general function of Td is expressed in (1):

$$Td=f(Tr,TA1,TA2) \qquad (1)$$

The value of Td may further be a function of an additional parameter. e.g., an implementation margin in the wireless device 22 (Tm). This time (Tm) is used to account for implementation error, e.g., error due to reception and/or transmission of signals. Examples of Tm are 0, 20 µs, 50 µs and 100 µs. Tm may also account for the time required to synchronize to the target cell, (e.g., to cell2 when switching from cell1 to cell2 or to cell1 when switching from cell2 to cell1). If the target cell is fully synchronized, then Tm=0; otherwise it is larger than 0. Examples of procedures or operations required by the wireless device 22 for synchronizing to the target cell are: time tracking, frequency tracking, settling of automatic gain controller (AGC), performing automatic frequency correction (AFC) especially when wireless device 22 speed is above threshold (e.g. more than 90 km/hour), etc. The value of Tm may further be dependent on the type of reference signals used for performing synchronization with respect to the target cell. Examples of these types of reference signals (RSs) are PSS, SSS, demodulation reference signal (DMRS), tracking reference signal (TRS), channel state information reference signal (CSI-RS), etc. For example, the occurrence (e.g., periodicity and/or density, e.g., number of RSs per time-frequency resource) may impact the value of Tm. For example, if the reference signal (RS) is more frequent (e.g., once every 5 ms) and/or is more dense (e.g., at least 2 resource elements every resource block), then the Tm will be shorter (e.g., shorter than or equal to a certain threshold value); otherwise Tm will be larger than the threshold value. In one or more embodiments, Tm and/or Td may correspond to a time period based at least in part on a timing value and/or parameter.

Another example of a general function including Tr is expressed in (2):

$$Td=f(Tr,TA1,TA2,Tm) \qquad (2)$$

An example of a specific function is expressed in (3):

$$Td=Tr+Tm+f1(TA1,TA2) \qquad (3)$$

An example of a specific function when TA1>TA2 is expressed in (4):

$$Td=Tr+Tm+(TA1-TA2) \qquad (4)$$

Another example of a specific function when TA2>TA1 is expressed in (5):

$$Td=Tr+Tm+(TA2-TA1) \qquad (5)$$

The value of Td (i.e., an example of a timing value) may further be a function of one or more additional parameters, for example:
- a first autonomous timing adjustment delay or error in cell1 (Tb1); and/or
- a second autonomous timing adjustment delay or error in cell2 (Tb2).

Examples of Tb1 and Tb2 are 0, 0.5 µs, 1 µs, 2 µs, 3 µs, etc.

The autonomous timing adjustment delay is also called the wireless device 22 initial transmit timing error. This timing error occurs on the uplink transmission, which typically occurs at a first transmission or when the wireless device 22 does not have a valid TA command for adjusting its timing. The first transmission takes place when there is initial transmission (e.g., random access), transmission after long inactivity (e.g., when the time alignment timer (TAT) has expired), first transmission during the DRX cycle, etc. In this case, the wireless device 22 autonomously derives its uplink timing for uplink transmission based on the DL timing of a DL cell, e.g., based on a DL reference signal used in the DL cell. Examples of DL RS are PSS, SSS, CSI-RS, DMRS etc.

The interruption time, Td, can be also expressed by a function. An example of a general function is expressed in (6):

$$Td=f(Tr,TA1,TA2,Tm,Tb1,Tb2) \qquad (6)$$

An example of a specific function that also takes into account Tb1 and Tb2 is expressed in (7):

$$Td=Tr+Tm+f1(TA1,TA2,Tb1,Tb2) \qquad (7)$$

An example of a specific function when TA1>TA2 and Tb1>Tb2 is expressed in (8):

$$Td=Tr+Tm+(TA1-TA2)+(Tb1-Tb2) \qquad (8)$$

An example of a specific function when TA1<TA2 and Tb1<Tb2 is expressed in (9):

$$Td=Tr+Tm+(TA2-TA1)+(Tb2-Tb1) \qquad (9)$$

If the procedure of switching the uplink transmission between cell1 and cell2 is triggered by the network node 16 then the wireless device 22 may receive a message or command from the network node 16 to perform the switching at certain reference time, Ty. The wireless device 22 needs time to process the message, e.g., over a duration of Tz. In this case, the time between the wireless device 22 receiving the message and the moment the wireless device 22 completes the switching corresponds to a total time of: Tz+Td. Tz is a processing time for processing the message. Examples of Tz are 15 ms, 20 ms, etc. During Tz, the wireless device 22 may not cause any interruption.

Step 3

In this step, the wireless device 22 may transmit signals in cell1 and/or in cell2 while interrupting the signals transmitted between the wireless device 22 and cell1 and/or between the wireless device 22 and cell2 over a duration which may not exceed Td. The wireless device 22 may cause interruption on signals transmitted: either between the wireless device 22 and cell1, or between the wireless device 22 and cell2 or between the wireless device 22 and both cell1 and cell2. The cells which are interrupted may be determined by the wireless device 22 based on one or more rules. The rules can be determined or obtained by the wireless device 22 by means of one or more of the following:
- based on a predefined rule; and/or
- based on instruction or message or command received from a network node 16, e.g., from NW1, NW2 or from another network node 16.

A general example of the rule is illustrated in TABLE 3. In one example, the wireless device 22 can be configured (e.g., based on a message received from the network node 16 or pre-defined criteria), whether the wireless device 22 will cause the entire interruption in one or more cells (e.g., cell1) of CG1, entire interruption in one or more cells (e.g., cell2) of CG2, or partial interruption in both CGs. Examples of partial interruption (e.g., 10 or 11) are X1% of Td and (100−X1)% of Td (or X2% of Td and (100−X2)%) in cells of CG1 and cells of CG2, respectively. Examples of X1 and X2 are 80 and 20, respectively.

TABLE 3

Interruption of signals in cells of different CGs (CG1 and CG2) during UL Tx switching between cell1 and cell2

| Interruption distribution case | Interruption in cells of CG1 in terms of percentage (%) of total interruption time (Td) | Interruption in cells of CG2 in terms of percentage (%) of total interruption time (Td) |
| --- | --- | --- |
| 00 | 100% | 0 |
| 01 | 0 | 100% |
| 10 | X1% | 100-X1 |
| 11 | X2% | 100-X2 |

TABLE 4 gives another specific example of distribution of the absolute value of interruption of signals between the wireless device 22 and cells (e.g., cell1) of CG1 and/or between the wireless device 22 and cells (e.g., cell2) of CG2, assuming X1=80, X2=20, and Td=2 ms.

TABLE 4

Interruption of signals in cells of different CGs (CG1 and CG2) during UL Tx switching between cell1 and cell2

| Interruption distribution case | Interruption in cells of CG1 (ms) | Interruption in cells of CG2 (ms) |
| --- | --- | --- |
| 00 | 2 ms | 0 |
| 01 | 0 | 2 ms |
| 10 | 1.6 ms | 0.4 ms |
| 11 | 0.4 ms | 1.6 ms |

Examples of criteria for determining or selecting one of the rules (percentage or amount of interruption to occur in cells of CG1 or CG2 or in both CG1 and CG2) are described below.

In one example of the rule, the interruption occurs in cell1 or cell2 or in both cells are based on the type of UL transmission.

For example, when certain control channel(s) are transmitted in the end of cell1 on UL-CC1, then the interruptions can be placed in cell2 in UL-CC2 transmissions. Similarly, when certain control channel(s) are transmitted at the beginning of the UL-CC2 transmissions, the interruptions can be placed in UL-CC1 transmissions. Examples of control channels may include SRS, DMRS, PTRS, etc., or any other UL channel which need to be protected.

In one example, when both the end UL symbols of UL-CC1 and beginning UL symbols of UL-CC2 are to be protected, then the interruption time can be shared between two UL CC equally.

In another example of the rule, the interruption occurs in cell1 or cell2, or in both cells, and are based on sub-carrier spacings used in cell1 and cell2. As an example, with smaller subcarrier spacing, the symbol duration may be larger. Therefore, according to one rule, the interruption or part of the interruption occurs in the UL CC with smaller subcarrier spacing (SCS) below or equal to a SCS-threshold (St). An example of St is 30 KHz. This rule may be less harmful in terms of UL throughput loss since a large part of the slot containing UL signals is transmitted by the wireless device 22 without any interruption.

A method in a network node 16 may include the following steps:

Step-1: transmitting a message or command to a wireless device at a reference time (Ty) for enabling the wireless device 22 to stop transmission in cell1 on a first UL carrier (UL-CC1) and start a new transmission in cell2 on a second UL carrier (UL-CC2) or vice versa.

Step-2: receiving an UL signal from cell2 on UL-CC2 if the wireless device 22 switches from cell1 to cell2 (or from cell1 on UL-CC1 if the wireless device 22 switches from cell2 to cell1) within a certain time period (Tz) starting from the reference time instance (Ty); and Step-3: adapting the received signals based on interruption of signals due to the uplink transmission, e.g., processing the received UL signal according to useful or available part of the signals after interruption. These steps are discussed in detail as follows.

Step-1

In this step, the network node 16 may transmit a message or a command to the wireless device 22 that the wireless device 22 should switch uplink transmission of signals between cell1 and cell2 operating on or belong to a first UL carrier (UL-CC1) and a second UL carrier (UL-CC2), respectively. The network node 16 may further indicate in the message that the wireless device 22, when switching the UL transmission, should cause interruption in cells of the source CG (e.g., cell1 in CG1 such as MCG) or in the cells of the target CG (e.g. cell2 in CG2 such as SCG) or in both source and target cells (e.g., in cells of both CG1 and CG2).

Examples of the message or command are RRC message, MAC message, L1 message, e.g., sent via DCI on DL control channel, etc. The message or command is transmitted to the wireless device 22 at a certain reference time instance (Ty). Examples of a reference time are the start of certain frame or subframe or time slot, e.g., starting from a certain frame number e.g. SFN=0, SFN=128, etc.

The network node 16 may send the command to the wireless device 22 on the single transmission based on any one or more of:

the buffer size of cells in CG1 and/or in CG2, e.g., if the traffic in cells in CG2 is above a certain threshold then the network node 16 may request the wireless device 22 to switch UL transmission from cell1 to cell2;

a pre-defined rule. For example, the wireless device 22 may switch the uplink transmission after a certain time period from one UL cell to another UL cell. Otherwise, the wireless device 22 may suspend UL transmission or go into idle state or lose connection, etc. In this case, the network node 16 sends a command to the wireless device 22 to change the cell for UL transmission, e.g., upon expiration of certain timer. The timer is set when the wireless device 22 starts UL transmission in a cell, e.g., in cell1 or cell2; and/or information received from another network node 16 (e.g., NW1, NW2 or another network node 16). For example NW2 may send a request to NW1 to request the wireless device 22 to switch from cell1 to cell2.

Step-2

In this step, the network node 16 receives the UL transmission in a target cell, e.g., in cell2 on second UL-CC2 from the wireless device 22 if the wireless device 22 has switched from cell1 to cell2 or in cell 1 on UL-CC1 from the wireless device 22 if the wireless device 22 has switched from cell1 to cell2 within a certain time period starting from the reference time (Ty). The duration of the time period includes Ty and Td where Td is described above. Based on the durations Ty and Td, the network node 16 determines the duration of the interruption (Td) of signals which the wireless device 22 shall cause in cell1 and/or in cell2 when switching the transmissions between cell1 and cell2. In one or more embodiments, the reference time (Ty) corresponds to a time where the wireless device 22 is to initiating switching or a time where the wireless device 22 is to initiate transmission with the new cell, e.g., cell2 if the wireless device 22 is switched from cell1 to cell2.

Step-3

Based on the information in step-2, the network node 16 may determine the useful part of UL transmissions in the target cell (e.g., in cell2 on UL-CC2) and detects the UL signals accordingly. The network node 16 further adapts the scheduling of signals in cell1 and/or in cell2 based on the received UL signals in the target cell.

SOME EXAMPLES

Example A1

A network node 16 configured to communicate with a wireless device 22 (wireless device 22), the network node 16 may comprise a radio interface 62 and may comprise processing circuitry 68 configured to:
transmit a message to the wireless device 22 at a reference time, Ty, instructing the wireless device 22 to stop transmission in a first cell on a first uplink carrier and start a new transmission in a second cell on a second uplink carrier;
receive a signal including the new transmission in the second cell on the second uplink carrier within a certain time Tz starting from the reference time, Ty;
determine a duration of an interruption based on Tz; and
determine the new transmission contained in the received signal based on the determined duration of the interruption.

Example A2

The network node 16 of Example A1, wherein the message is transmitted in response to detecting that traffic in a cell group to which the second cell belongs is above a threshold.

Example A3

The network node 16 of Example A1, wherein the message further instructs the wireless device 22 to switch cells upon expiration of a specified time period.

Example B1

A communication system including a host computer 24, the host computer 24 may comprise:
processing circuitry 42 configured to provide user data; and
a communication interface 40 configured to forward the user data to a cellular network for transmission to a wireless device 22,
the cellular network 10 comprising a network node 16 that may have a radio interface 62 and may have processing circuitry 68, the network node's radio interface 62 and processing circuitry 68 configured to:
transmit a message to the wireless device 22 at a reference time, Ty, instructing the wireless device 22 to stop transmission in a first cell on a first uplink carrier and start a new transmission in a second cell on a second uplink carrier;
receive a signal including the new transmission in the second cell on the second uplink carrier within a certain time Tz starting from the reference time, Ty;
determine a duration of an interruption based on Tz; and
determine the new transmission contained in the received signal based on the determined duration of the interruption.

Example B2

The communication system 10 of Example B1, further including the network node 16.

Example B3

The communication system 10 of Example B2, further including the wireless device 22, wherein the wireless device 22 is configured to communicate with the network node 16.

Example B4

The communication system 10 of Example B3, wherein:
the processing circuitry 42 of the host computer 24 is configured to execute a host application, thereby providing the user data; and
the wireless device 22 may comprise processing circuitry 84 configured to execute a client application 92 associated with the host application 50.

Example C1

A method implemented in a network node 16, the method comprising:
transmitting a message to the wireless device 22 at a reference time, Ty, instructing the wireless device 22 to stop transmission in a first cell on a first uplink carrier and start a new transmission in a second cell on a second uplink carrier;
receiving a signal including the new transmission in the second cell on the second uplink carrier within a certain time Tz starting from the reference time, Ty;
determining a duration of an interruption based on Tz; and
determining the new transmission contained in the received signal based on the determined duration of the interruption.

Example C2

The method of Example C1, wherein the message is transmitted in response to detecting that traffic in a cell group to which the second cell belongs is above a threshold.

Example C3

The method of Example C1, wherein the message further instructs the wireless device 22 to switch cells upon expiration of a specified time period.

Example D1

A method implemented in a communication system 10 including a host computer 24, a network node 16 and a wireless device 22, the method comprising:
at the host computer 24, providing user data; and
at the host computer 24, initiating a transmission carrying the user data to the wireless device 22 via a cellular network comprising the network node 16, the network node 16 configured to:
- transmit a message to the wireless device 22 at a reference time, Ty, instructing the wireless device 22 to stop transmission in a first cell on a first uplink carrier and start a new transmission in a second cell on a second uplink carrier;
- receive a signal including the new transmission in the second cell on the second uplink carrier within a certain time Tz starting from the reference time, Ty;
- determine a duration of an interruption based on Tz; and
- determine the new transmission contained in the received signal based on the determined duration of the interruption.

Example D2

The method of Example D1, further comprising, at the network node 16, transmitting the user data.

Example D3

The method of Example D2, wherein the user data is provided at the host computer 24 by executing a host application 50, the method further comprising, at the wireless device 22, executing a client application 92 associated with the host application 50.

Example E1

A wireless device 22 configured to communicate with a network node 16, the wireless device 22 may comprise a radio interface 82 and may comprise processing circuitry 84 configured to:
- receive from the network node 16 a message instructing the wireless device 22 to stop a first transmission in a first cell on a first uplink carrier and start a second transmission in a second cell on a second uplink carrier;
- determine an interruption time, Td, being a function of a switching delay and first timing advance and a second timing advance; and
- stop the first transmission and start the second transmission such that the delay between the stopping and the starting does not exceed Td.

Example E2

The wireless device 22 of Example E1, wherein the stopping and the starting occurs after a specified period of time.

Example E3

The wireless device 22 of Example E1, wherein the interruption time Td does not exceed a specified period of time.

Example F1

A communication system 10 including a host computer 24, the host computer 24 may comprise:
- processing circuitry 42 configured to provide user data; and
- a communication interface 40 configured to forward user data to a cellular network for transmission to a wireless device 22, the wireless device 22 may comprise a radio interface 82 and may comprise processing circuitry 84, the wireless device's processing circuitry 84 configured to:
- receive from the network node 16 a message instructing the wireless device 22 to stop a first transmission in a first cell on a first uplink carrier and start a second transmission in a second cell on a second uplink carrier;
- determine an interruption time, Td, being a function of a switching delay and first timing advance and a second timing advance; and
- stop the first transmission and start the second transmission such that the delay between the stopping and the starting does not exceed Td.

Example F2

The communication system 10 of Example F1, further including the wireless device 22.

Example F3

The communication system 10 of Example F2, wherein the cellular network further includes a network node 16 configured to communicate with the wireless device 22.

Example F4

The communication system 10 of Example F2 or F3, wherein:
- the processing circuitry 42 of the host computer 24 is configured to execute a host application 50, thereby providing the user data; and
- the wireless device's processing circuitry 84 is configured to execute a client application 92 associated with the host application 50.

Example G1

A method implemented in a wireless device 22, the method comprising:
- receiving from the network node 16 a message instructing the wireless device 22 to stop a first transmission in a first cell on a first uplink carrier and start a second transmission in a second cell on a second uplink carrier;
- determining an interruption time, Td, being a function of a switching delay and first timing advance and a second timing advance; and
- stopping the first transmission and starting the second transmission such that the delay between the stopping and the starting does not exceed Td.

Example G2

The method of Example G1, wherein the stopping and the starting occurs after a specified period of time.

Example G3

The method of Example G1, wherein the interruption time Td does not exceed a specified period of time.

Example H1

A method implemented in a communication system 10 including a host computer 24, a network node 16 and a wireless device 22, the method comprising:

at the host computer 24, providing user data; and at the host computer 24, initiating a transmission carrying the user data to the wireless device 22 via a cellular network comprising the network node 16, the wireless device 22 configured to:

receive from the network node 16 a message instructing the wireless device 22 to stop a first transmission in a first cell on a first uplink carrier and start a second transmission in a second cell on a second uplink carrier;

determine an interruption time, Td, being a function of a switching delay and first timing advance and a second timing advance; and stop the first transmission and start the second transmission such that the delay between the stopping and the starting does not exceed Td.

Example H2

The method of Example H1, further comprising, at the wireless device 22, receiving the user data from the network node 16.

Example I1

A network node 16, comprising:

a memory module 73 configured to store a message instructing the wireless device 22 to stop transmission in a first cell on a first uplink carrier and start a new transmission in a second cell on a second uplink carrier a radio interface module 63 configured to:

transmit the message to the wireless device 22; and receive a signal including the new transmission in the second cell on the second uplink carrier within a certain time Tz starting from the reference time, Ty; and an interrupt duration determination module 33 configured to determine a duration of an interruption based on Tz; and a transmission determination module 77 configured to determine the new transmission contained in the received signal based on the determined duration of the interruption.

Example I2

A wireless device 22, comprising:

a memory module 89 configured to store a message instructing the wireless device 22 to stop a first transmission in a first cell on a first uplink carrier and start a second transmission in a second cell on a second uplink carrier a radio interface module 83 configured to receive the message from a network node 16;

an interrupt duration determination module 35 configured to determine an interruption time, Td, being a function of a switching delay and first timing advance and a second timing advance;

a switching module 95 configured to stop the first transmission and start the second transmission such that the delay between the stopping and the starting does not exceed Td.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A method performed by a wireless device configured to communicate on a first carrier with a first cell that is part of a first cell group and on a second carrier with a second cell that is part of a second cell group, the method comprising:
   determining a timing value, the timing value being associated with one or both of the first cell and second cell, the timing value being based on an indication from the first cell and a maximum of:
      a radio frequency switching time of the wireless device; and
      a function of at least one of the RF switching time of the wireless device, a first timing advance of the first cell group and a second timing advance of the second cell group;
   receiving a first message configured to cause the wireless device to switch from a first transmission on the first carrier of the first cell to a second transmission on the second carrier of the second cell based at least in part on the determined timing value associated with the second cell;
   stopping the first transmission in the first cell on the first carrier; and
   switching to perform the second transmission in the second cell on the second carrier after a time period corresponding to the timing value, the stopping of the first transmission in the first cell and the performing of the second transmission in the second cell corresponding to an interruption of downlink signals from the first cell or the second cell.

2. The method of claim 1, further comprising determining whether a predefined rule is met, the stopping of the first transmission in the first cell and the performing of the second transmission in the second cell being in response to the predefined rule being met, wherein the predefined rule is based on one of a numerology of a signal and predefined time period.

3. The method of claim 1, wherein the timing value is based at least in part on one or more of:
   an error due to one of reception and transmission at the wireless device; and
   an autonomous timing adjustment delay of the wireless device.

4. The method of claim 1, wherein the first cell and the second cell are provided by a network node.

5. The method of claim 1, wherein the first cell is associated with a first radio access technology, RAT, and the second cell is associated with a second RAT different from the first RAT.

6. The method of claim 1, wherein the second cell group is different from the first cell group.

7. The method of claim 1, wherein the method further includes one or both of:
   receiving a second message from the first cell, the received second message including the indication, the indication indicating to the wireless device to apply at least a portion of a delay in transmission to at least one of an uplink transmission in the first cell and an uplink transmission in the second cell, the delay corresponding to the timing value; and
   switching to perform the second transmission in the second cell on the second carrier after the time period corresponding to the timing value, in response to the second message from the first cell.

8. A wireless device configured to communicate on a first carrier with a first cell that is part of a first cell group and on a second carrier with a second cell that is part of a second cell group, the wireless device comprising:
   processing circuitry configured to:
      determine a timing value, the timing value being associated with one or both of the first cell and second cell, the timing value being based on an indication from the first cell and a maximum of:
         a radio frequency switching time of the wireless device; and
         a function of at least one of the RF switching time of the wireless device, a first timing advance of the first cell group and a second timing advance of the second cell group;
      receiving a first message configured to cause the wireless device to switch from a first transmission on the first carrier of the first cell to a second transmission on the second carrier of the second cell based at least in part on the determined timing value associated with the second cell;
      stop the first transmission in the first cell on the first carrier; and
      switch to perform the second transmission in the second cell on the second carrier after a time period corresponding to the timing value, the stopping of the first transmission in the first cell and the performing of the second transmission in the second cell corresponding to an interruption of downlink signals from the first cell or the second cell.

9. The wireless device of claim 8, wherein the processing circuitry is further configured to determine whether a predefined rule is met, the stopping of the first transmission in the first cell and the performing of the second transmission in the second cell being in response to the predefined rule being met, wherein the predefined rule is based on one of a numerology of a signal and predefined time period.

10. The wireless device of claim 8, wherein the timing value is based at least in part on one or more of:
   an error due to one of reception and transmission at the wireless device; and
   an autonomous timing adjustment delay of the wireless device.

11. The method of claim 8, wherein the second cell group is different from the first cell group.

12. The wireless device of claim 8, wherein the processing circuitry is further configured to one or both of:
- receive a second message from the first cell, the received second message including the indication, the indication indicating to the wireless device to apply at least a portion of a delay in transmission to at least one of an uplink transmission in the first cell and an uplink transmission in the second cell, the delay corresponding to the timing value; and
- switch to perform the second transmission in the second cell on the second carrier after the time period corresponding to the timing value, in response to the second message from the first cell.

* * * * *